United States Patent [19]

Kikuchi et al.

[11] Patent Number: 5,552,901
[45] Date of Patent: Sep. 3, 1996

[54] FACSIMILE SERVER SYSTEM COMPRISING A FACSIMILE SERVER AND AT LEAST ONE REMOTE FACSIMILE

[76] Inventors: Satoshi Kikuchi, 213, Hachimanyama-Apartment, 1545, Yoshida-cho; Keiichi Nakane, 406, Co-op-Nomura-Totsuka-Shimokurata, 250-1, Shimokurata-cho; Hiromichi Itoh, I-305, Bell-Heim, 1393, Yabe-cho; Hiroshi Kawamura, B-403, Kamikurata-Shataku, 2000, Kamikurata-cho, all of Totsuka-ku, Yokohama-shi, Kanagawa-ken, Japan

[21] Appl. No.: 188,085

[22] Filed: Jan. 28, 1994

[30] Foreign Application Priority Data

Feb. 1, 1992 [JP] Japan ................................ 5-014782

[51] Int. Cl.$^6$ ........................................... H04N 1/32
[52] U.S. Cl. ..................... 358/468; 358/442; 370/94.1
[58] Field of Search .................... 358/400, 402, 358/403, 434–440, 468, 442, 444; 379/94, 100; 370/61, 85.13, 94.3, 94.1, 110.1; 340/825.05, 825.5, 825.51; H04N 1/32, 1/00

[56] References Cited

U.S. PATENT DOCUMENTS

| | | | |
|---|---|---|---|
| 4,887,075 | 12/1989 | Hirasawa | 370/85.1 |
| 5,068,888 | 11/1991 | Scherk et al. | 379/100 |
| 5,111,452 | 5/1992 | Kyuma | 370/85.1 |
| 5,124,813 | 6/1992 | Minowa et al. | 358/468 |
| 5,200,993 | 4/1993 | Wheeler et al. | 358/442 |
| 5,227,893 | 7/1993 | Ett | 358/403 |
| 5,267,047 | 11/1993 | Argenta et al. | 358/403 |

FOREIGN PATENT DOCUMENTS

| | | |
|---|---|---|
| 59-64956 | 4/1984 | Japan . |
| 1-101060 | 4/1989 | Japan . |
| 3-44230 | 2/1991 | Japan . |
| 3-128565 | 5/1991 | Japan . |
| 4-72859 | 3/1992 | Japan . |

*Primary Examiner*—Kim Yen Vu
*Attorney, Agent, or Firm*—Bardehle, Pagenberg, Dost, Altenburg, Frohwitter, Geissler & Partners

[57] ABSTRACT

A facsimile server system which can be utilized similarly to a stand-alone FAX. A remote FAX includes a scanner, a printer and a FAX communication unit. A client delivers document data to a FAX server, and makes a request for FAX transmission/printing. The FAX server expands the document data requested to be transmitted, into image data, and it transfers the image data to the appropriate remote FAX and gives a command for the FAX transmission/printing. When instructed to perform FAX transmission directly by a user, the remote FAX accepts the image of a handwritten document, and it subsequently delivers the image data of the document to the FAX server and makes a request for the FAX transmission. Besides, when the remote FAX has been commanded to scan image data or has received image data as FAX reception, it delivers the scanned image data or the received image data to the FAX server. Then, the FAX server accumulates the image data and offers them to the client in accordance with a retrieval process.

30 Claims, 11 Drawing Sheets

FIG. 6

| REMOTE FAX IDENTIFIER | STATUS | REMAINING CAPACITY OF IMAGE FILE |
|---|---|---|
| 18a | 18b | 18c |
| | | |

DIAL INFORMATION TABLE

| REMOTE FAX IDENTIFIER | REGISTERED NO. | DESTINATION USER IDENTIFIER | DESTINATION TEL NO. |
|---|---|---|---|
| 31a | 31b | 31c | 31d |
| | | | |

31

COMMUNICATION MANAGEMENT TABLE

| REMOTE FAX IDENTIFIER | COMMUNICATION MODE | OPPOSITE USER IDENTIFIER | NUMBER OF SHEETS | RESULT OF COMMUNICATION |
|---|---|---|---|---|
| 32a | 32b | 32c | 32d | 32e |
| | | | | |

DIAL REGISTRATION

REMOTE FAX ~52
REGISTERED NO. ~53
DESTINATION USER IDENTIFIER ~54
DESTINATION TEL NO. ~55

OK ~56    CANCEL ~57

FIG. 14

COMMUNICATION MANAGEMENT REPORT

REMOTE FAX ~58

⟨TRANSMISSION⟩

| OPPOSITE USER IDENTIFIER | NUMBER OF SHEETS | RESULT OF COMMUNICATION |
|---|---|---|
|  |  |  |

~59

⟨RECEPTION⟩

| OPPOSITE USER IDENTIFIER | NUMBER OF SHEETS | RESULT OF COMMUNICATION |
|---|---|---|
|  |  |  |

~60

OK ~61

FACSIMILE SERVER SYSTEM COMPRISING A FACSIMILE SERVER AND AT LEAST ONE REMOTE FACSIMILE

BACKGROUND OF THE INVENTION

1. Field of the Invention

The present invention relates to a client/server system which is constructed in connection with a LAN (Local Area Network). More particularly, it relates to a system which offers a facsimile communication facility to the user of each client terminal.

2. Description of the Related Art

At present, facsimiles (FAXes) which read and transmit handwritten documents in the form of image data are widespread as electronic means for delivering the documents.

In this regard, with the promotion of OA (office automation), it has often become necessary to create a document by the use of a dedicated word processor (hereinbelow, abbreviated to "WP") and to create a business document through the utilization of a document processing application program or DTP (DeskTop Processing) application program installed in a personal computer (hereinbelow, abbreviated to "PC") or work station (hereinbelow, abbreviated to "WS").

When the document created by the information processor is to be transmitted by a stand-alone type FAX, it is necessary to once print the created document on recording paper by a printer and thereafter read the printed document by the scanner of the FAX. However, when the document printed by the printer is read by the scanner in this manner, the definition of a pictorial image degrades. Moreover, the recording paper and the task of printing the document are required.

Meanwhile, in recent years, client/server systems in each of which information processors such as PC's and WS's are connected by a LAN have come into wide use. In such a client/server system, a user can access various servers (for example, a file server, a database server and a print server) via the LAN from the desktop client equipment. Accordingly, a file, a printer, etc. can be shared among a plurality of users so as to efficiently utilize the resources.

Besides, according to a FAX server which conforms to the client/server system, it is possible to solve the problems of the stand-alone type FAX as stated above. Regarding the FAX server, there has been known, for example, a system which is disclosed in the official gazette of Japanese Patent Application Laid-open No. 44230/1991.

FIG. 2 of the accompanying drawings illustrates the construction of such a client/server system including the FAX server.

As shown in the figure, the client/server system is such that the FAX server 1 which is endowed with the facility of expanding document data into an image and the facility of FAX-communicating the image, the file server 2 which is furnished with a storage device of large capacity, the clients (client terminals or client equipment) 3 such as PC's, WS's and WP's, scanners 7 which read and binarize (turn into binary data) handwritten documents, and the printers 8 which print the document data on recording paper are interconnected by the LAN 4. In addition, the FAX server 1 is connected to opposite (opposite-party) FAXes 6 via a public switched network 5.

In the client/server system, the user creates a document through the application program of the client 3 and transfers the data of the created document to the FAX server 1 connected with the LAN 4. The FAX server 1 expands the transferred document data into an image, and converts the image into data in the data format of the FAXes 6. Thereafter, it transmits the image data to a designated one of the opposite FAXes 6 via the public switched network 5.

In this manner, in the client/server system which includes the FAX server 1, the document created using the application program of the client 3 can be transmitted to the opposite FAX 6 without being printed once.

Nevertheless, even in enterprises which have made their business transactions paperless owing to the above FAX server 1 in the prior art, it is still requested on account of a troublesome operating procedure, etc. that handwritten documents be transmitted to the opposite FAXes 6 directly without the intervention of the client/server system. In such an enterprise, therefore, both the FAX server 1 and the stand-alone FAXes 6 are often utilized depending upon purposes or users, without excluding or removing the existing stand-alone FAXes 6.

Besides, in the enterprise which has introduced the client/server system, the plurality of printers 8 are usually installed within an office in order that documents created using the application of the client 3 may be printed on recording paper. The plurality of scanners 7 are also installed in order to insert the image data of handwritten patterns etc. into the documents created using the application of the client 3.

In this manner, the scanners 7, printers 8 and stand-alone FAXes 6 in large numbers need to be arranged here and there in the enterprise which has introduced the prior-art FAX server 1. This has formed causes for the increase of a system cost and the deficiency of a space where the individual devices are installed.

Moreover, the prior-art FAX server 1 is ordinarily implemented in such a way that a FAX control board which includes an IC (semiconductor integrated circuit), an LSI (large-scale integrated circuit) or the like required for the FAX communication is mounted in the PC or WS connected to the LAN 4. In this regard, in the FAX communication, the data are transmitted to the opposite FAX 6 by utilizing the public switched network 5. Accordingly, unless high-speed real-time processing is executed, the burden of a communication cost to the user will increase. Therefore, the real-time FAX communication has heretofore been realized in such a way that at least one PC or WS to operate as the FAX server 1 is used exclusively for the FAX communication. In consequence, the user has been unable to apply the PC or WS of the FAX server 1 to any other use.

SUMMARY OF THE INVENTION

In view of the circumstances of the prior art, the present invention has for its object to provide a facsimile server system which can reduce a system cost and an installation space.

Another object of the present invention is to provide a facsimile server system which can be utilized likewise to a conventional stand-alone FAX.

Still another object of the present invention is to realize the parallel runs of other business applications etc. in a PC or WS which is operated as a FAX server.

In order to accomplish the objects, the present invention provides a facsimile server system which offers a facility of facsimile communication proceeding through a communication network, to at least one client connected to facsimile server system via a LAN (local area network), comprising:

a FAX (facsimile) server connected to the LAN, and at least one remote FAX connected to the LAN and the communication network;

the FAX server including LAN controller for controlling a communication which proceeds through the LAN, document data storage for storing therein at least one document data trasferred from the client and requested to be transmitted via the communication network by the client, a transmission document table for registering therein that destination of the document data stored in the document data storage which has been designated by the client, data conversion unit for expanding the document data stored in the document data storage, into image data on condition that the document data are not image data, and communication management unit for transferring the image data which correspond to the document data requested to be transmitted, to the appropriate remote FAX, and for giving the appropriate remote FAX a command for performing the facsimile transmission to the destination which is registered in the transmission document table in correspondence with the transferred image data;

the remote FAX including a LAN control unit for controlling a communication which proceeds through the LAN, a scanner for reading a pictorial image and then generating image data, a printer for printing a pictorial image expressed by image data, and FAX communication controller for performing the commanded facsimile transmission of the image data transferred from the FAX server, to the destination through the communication network.

In one aspect of performance of the facsimile server system according to the present invention, as illustrated in FIG. 1, the FAX server 1 expands document data created through the application of the client 3 by the user of the client 3, into image data. Thereafter, it transfers the image data to the remote FAX 9 via the LAN 4 and requests the remote FAX 9 to perform FAX transmission or printing. In the case of the request for the FAX transmission, the remote FAX 9 converts the transferred image data into data in the data format of an opposite (opposite-party) FAX 6 and transmits the latter data to the opposite FAX 6 via a public switched network (as the communication network) 5 in conformity with a FAX protocol. On the other hand, in the case of the request for the printing, the remote FAX 9 prints the transferred image data on recording paper by means of the printer.

In addition, the remote FAX 9 receives image data from the opposite FAX 6 via the public switched network 5 in conformity with the FAX protocol or reads image data through the scanner, and it transfers the image data to the FAX server 1 via the LAN 4. The FAX server 1 accumulates the transferred image data so as to cope with a document retrieval process for the user.

As stated above, the facsimile server system according to the present invention consists in that the FAX communication processing which needs to be real-time processed has its load distributed to the remote FAX 9. Thus, the FAX server 1 may perform only the image expansion processing. Therefore, according to the present invention, an information processor such as PC (personal computer) or WS (work station) to operate as the FAX server 1 becomes capable of the parallel runs of business application programs etc. which the user uses. Moreover, since the remote FAX 9 can be utilized instead of the scanner (7 in FIG. 2) and the printer (8) in the prior art, the system cost and installation space of the whole system can be reduced.

BRIEF DESCRIPTION OF THE DRAWINGS

FIG. 6 is an explanatory diagram showing the organization of a status table;

FIG. 7 is an explanatory diagram showing the table organizations of a parameter file;

FIG. 13 is an explanatory diagram showing another example of display which is presented in order to accept an input by the client equipment;

FIG. 14 is an explanatory diagram showing still another example of display which is presented in order to accept an input by the client equipment;

PREFERRED EMBODIMENTS OF THE INVENTION

Now, an embodiment of a facsimile server system according to the present invention will be described.

Figure 1:
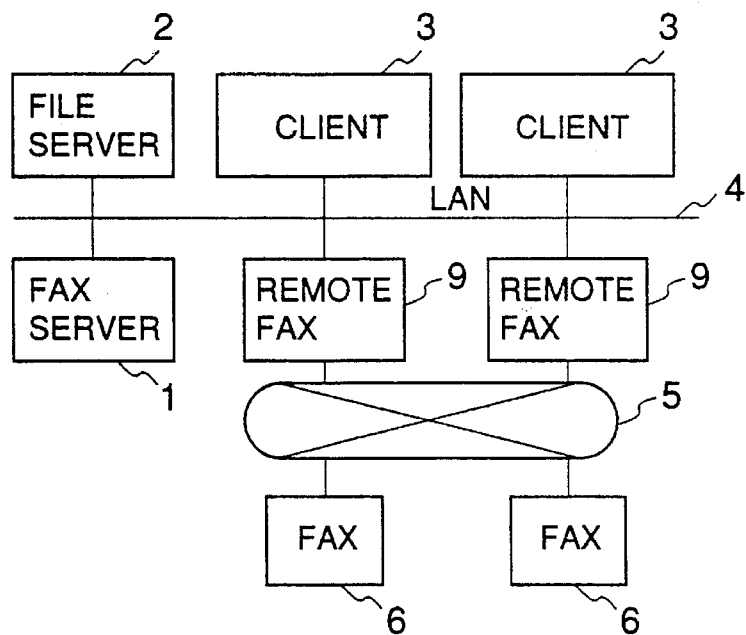
FIG. 1 is a block diagram showing an example of construction of a facsimile server system in an embodiment of the present invention.

FIG. 1 illustrates the general construction of the facsimile server system in this embodiment.

As shown in the figure, the facsimile server system of this embodiment constructs a client/server system out of clients (client terminals or equipment) 3, a FAX (facsimile) server 1, remote FAXes (facsimiles) 9 and a file server 2. These equipments 1, 2, 3 and 9 are interconnected by a LAN (Local Area Network) 4. In addition, the remote FAXes 9 are connected to opposite (opposite-party) FAXes 6 via a public switched network 5.

Here, the FAX server 1 has the facility of expanding document data into an image so as to send the image to the remote FAX 9 and requesting the remote FAX 9 to transmit the image to the opposite FAX 6 or to print the image, in compliance with a request made by the client 3, the facility of accumulating document data transferred from the remote FAX 9 and seeking any document in compliance with a request made by the client 3, and so forth.

The plurality of remote FAXes 9 can be installed within the client/server system (within an office), and they are respectively given logical equipment identifiers beforehand in order to distinguish them. In addition to the facilities of an ordinary stand-alone FAX, the remote FAX 9 has the facility of transmitting the document data transferred from the FAX server 1 or document data read through the read control unit thereof (23 in FIG. 4), to the opposite FAX 6, the facility of printing the document data transferred from the FAX server 1, by means of the record control unit thereof (24 in FIG. 4), and the facility of transferring document data received from the opposite FAX 6 or document data read through the read control unit 23, to the FAX server 1.

That is, the remote FAX 9 functions as the ordinary stand-alone FAX, the very remote FAX, a remote scanner and a remote printer.

The client 3 and the file server 2 are the same as in the prior art, respectively.

The internal constituent layouts of the FAX server 1 and the remote FAX 9 will be explained below.

Figure 3:
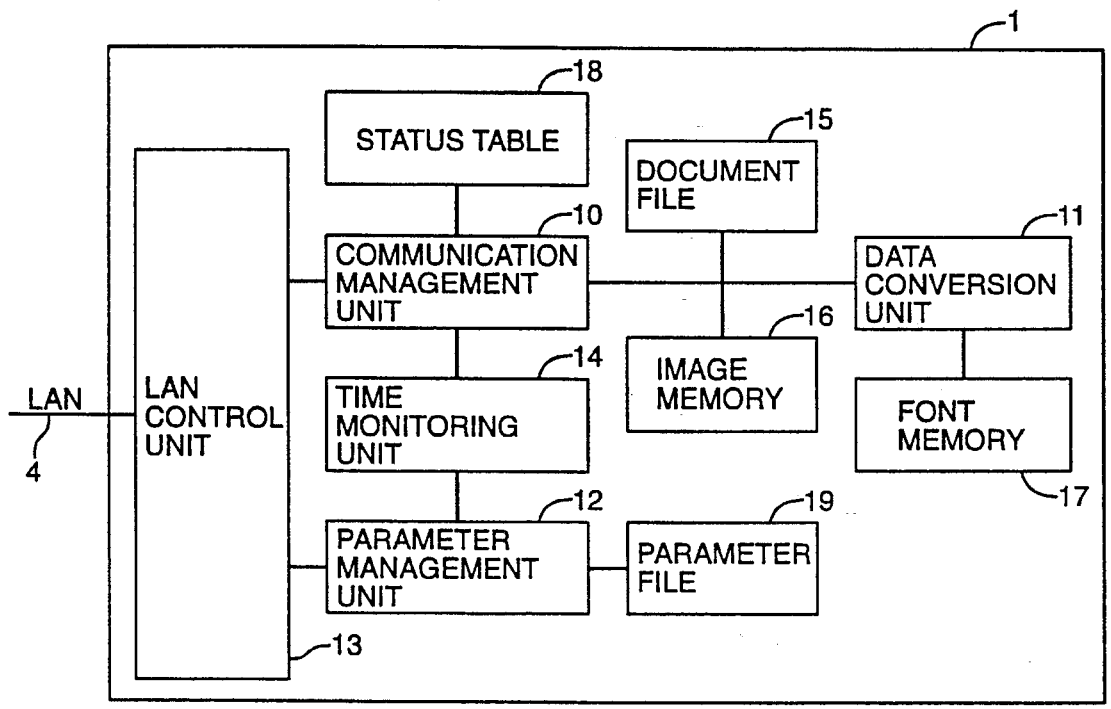
FIG. 3 is a block diagram showing the constituent layout of a FAX server in an embodiment of the present invention.

FIG. 3 illustrates the block arrangement of the FAX server 1 in this embodiment.

Referring to the figure, a communication management unit 10 exchanges document data and control information between the client 3 and the remote FAX 9. A data conversion unit 11 expands document data created by the application of the client 3, into an image. A parameter management unit 12 exchanges parameter data with the client 3 on the remote FAX 9. A LAN control unit 13 executes data transmission which conforms to the protocol of the LAN 4.

Besides, a time monitoring unit 14 manages the current time and date so as to periodically start the communication management unit 10 or the parameter management unit 12. A document file 15 stores document data and relevant information. An image memory 16 temporarily stores the data of the expanded image. A font memory 17 stores bitmap information such as character patterns and graphic patterns. A status table 18 stores the statuses of the individual remote FAXes 9. A parameter file 19 stores the registered parameter data of the individual remote FAXes 9.

The FAX server 1 is actually implemented in such a way that a PC (personal computer) or WS (work station) furnished with LAN facilities runs predetermined FAX server programs for executing processes to be stated later.

Figure 4:
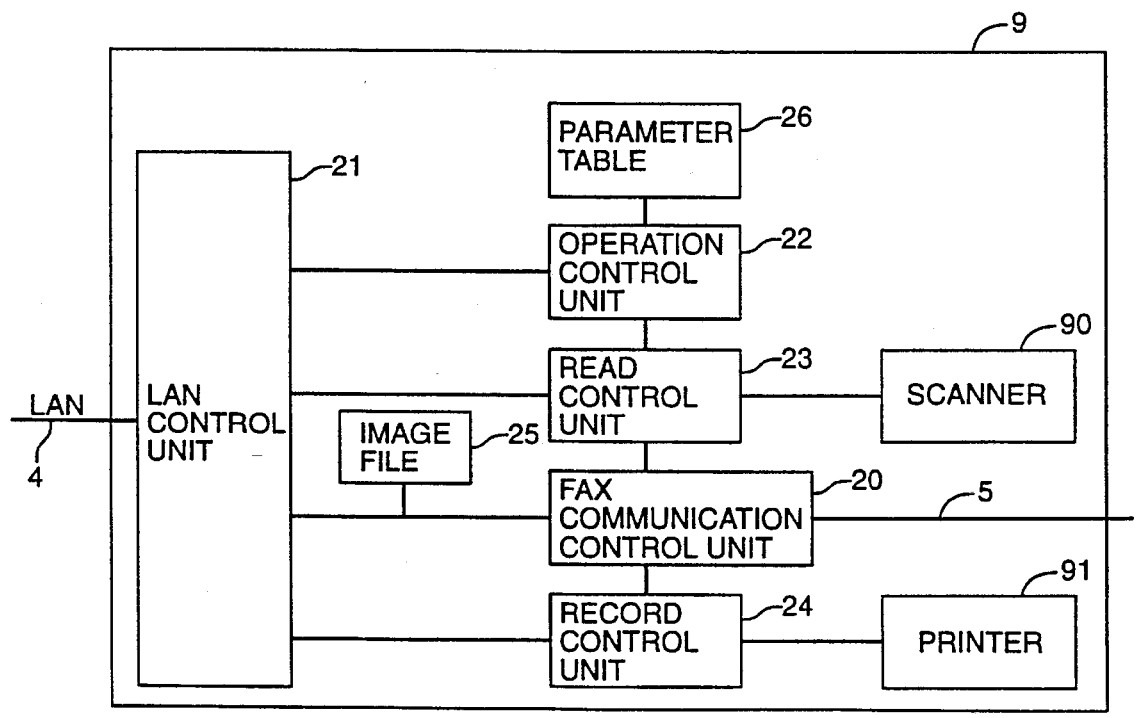
FIG. 4 is a block diagram showing the constituent layout of a remote FAX in an embodiment of the present invention.

Next, FIG. 4 illustrates the block arrangement of the remote FAX 9 in this embodiment.

Referring to the figure, a FAX communication control unit 20 executes the FAX communication between this remote FAX 9 and the opposite FAX 6 through the public switched network 5. Numeral 90 indicates a scanner, and numeral 91 a printer. Besides, a LAN control unit 21 executes data transmission which conforms to the protocol of the LAN 4. An operation control unit 22 supports the parameter registering operation of the user of the client 3 through an operator panel which is furnished with a small-sized display unit and a ten-key pad. The read control unit 23 referred to before controls the scanner 90 so as to read a handwritten document and generate binarized data (binary data into which the data of the document have been converted).

Further, the record control unit 24 referred to before prints document data on recording paper by the use of the printer 91. A pictorial image file 25 stores document data temporarily. A parameter table 26 stores parameter data registered by the user.

Next, the contents of the files and tables in the FAX server 1 will be explained.

Figure 5:
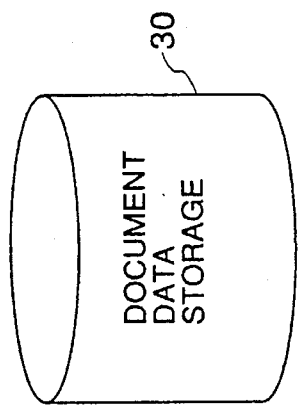
FIG. 5 is an explanatory diagram showing the table organizations of a document file.

First, FIG. 5 illustrates the table organizations of the document file 15.

As shown in the figure, the document file 15 includes a document data storage 30 for storing document data, and besides, a transmission document table 27 which stores information on transmission documents, a reception document table 28 which stores information on reception documents, and a print document table 29 which stores information on print documents. The external storage of the PC or WS to operate as the FAX server 1 is employed as the document data storage 30. In addition, the above tables 27, 28 and 29 may be formed in the internal memory of the PC or WS during the runs of the FAX server programs and then held resident therein. Alternatively, they may well be implemented in the external storage of the PC or WS.

Herein, the transmission document table 27 is configured of an area 27a for storing the user identifier of each request for FAX transmission, an area 27b for storing the user identifier of each transmission destination, an area 27c for storing the telephone No. of the destination, an area 27d for storing the time and date of the transmission, an area 27e for storing the data format of the data of each document accumulated in the document data storage 30, an area 27f for storing the accumulation start address of the document data, and an area 27g for storing the size of the accumulated data. The data format area 27e stores data which indicate the formats of the accumulated document data, for example, data which identify a text data format, an image data format, etc. Also, the broadcast facility of transmitting the identical document to the plurality of different opposite FAXes 6 can be realized by utilizing the transmission document table 27. In this case, a plurality of destination user identifiers and destination telephone Nos. are respectively set in the areas 27b and 27c with respect to the single document.

The reception document table 28 is configured of an area 28a for storing a serial No. bestowed on each reception document, an area 28b for storing the identifier of the remote FAX 9 having received the document, an area 28c for storing the identifier of each transmission side user, an area 28d for storing the date and hour of the reception of the document, an area 28e for storing the accumulation start address of the data of each document accumulated in the document data storage 30, and an area 28f for storing the size of the accumulated data.

The print document table 29 is configured of an area 29a for storing the identifier of each remote FAX 9 having made a request for printing, an area 29b for storing the data format of the data of each document accumulated in the document data storage 30, an area 29c for storing the start address of the accumulation, and an area 29d for storing the size of the accumulated data.

Next, FIG. 6 illustrates the organization of the status table 18.

As shown in the figure, the status table 18 is configured of an area 18a for storing the identifier of each remote FAX 9, an area 18b for storing status information, and an area 18c for storing the remaining capacity of the image file 25 in each remote FAX 9.

Next, FIG. 7 illustrates the table organizations of the parameter file 19.

As shown in the figure, the parameter file 19 includes a dial information table 31 which stores the telephone No. of each transmission destination, etc., and a communication management table 32 which stores communication history information.

The dial information table 31 is configured of an area 31a for storing the identifier of each remote FAX 9, an area 31b for storing each No. registered for abbreviation or one-touch dialing, or the like, an area 31c for storing the user identifier of each transmission destination, and an area 31d for storing the telephone No. of the transmission destination.

The communication management table 32 is configured of an area 32a for storing the identifier of each remote FAX 9, an area 32b for storing each communication mode, an area 32c for storing the user identifier of each opposite communication party, an area 32d for storing the number of sheets in each communication, and an area 32e for storing the result of the communication. The communication mode in the area 32b expresses transmission or reception, while the opposite user identifier in the area 32c is the identifier of the opposite FAX 6 of which the remote FAX 9 is notified in the FAX protocol. In addition, the number of sheets of the communication in the area 32d is the number of sheets of a transmitted or received document, while the result of the communication in the area 32e expresses the completion or failure of the communication.

Now, the operations of the facsimile server system in this embodiment will be described centering around the operations of the FAX server 1.

The FAX server 1 in this embodiment chiefly performs the three operations of a transmission/print operation, a reception/read operation and a parameter processing operation.

First, the transmission/print operation will be explained.

1. Transmission/Print Operation

The FAX server 1 performs a status reception process, a transmission/print acceptance process, a transmission/print request process, a sorting transmission process and an activity stop process as processes concerning the transmission/print operation. The details of the individual processes will be explained below.

(1) Status Reception Process

The communication management unit 10 executes this process upon receiving the notification of a status from the remote FAX 9.

The FAX communication control unit 20 of the remote FAX 9 notifies the FAX server 1 of the operating levels of the equipment 9 as the statuses thereof at the start and end of the communication of this remote FAX 9 with the opposite FAX 6. Here, by way of example, the operating level #0 shall represent "standing by (idle status)", the operating level #1 "standing by for retry transmission", and the operating level #2 "operating". Incidentally, the "retry transmission" signifies the facility of retransmitting a document after a predetermined time period when the opposite FAX 6 is in the busy status thereof in spite of the remote FAX 9 having once tried the transmission of the document. Throughout the "standing by for retry transmission" period, the remote FAX 9 has its operating level kept intermediate between the "standing by" level and the "operating" level because it is scheduled to transmit the document within a short time period.

The communication management unit 10 of the FAX server 1 having received the status notification from the remote FAX 9 registers the received operating level in the status area 18b corresponding to the reception remote FAX 9, with reference to the remote FAX identifier of the area 18a in the status table 18.

(2) Transmission/Print Acceptance Process

The communication management unit 10 executes this process upon receiving a FAX transmission reserving request or a print reserving request from the client 3 or the remote FAX 9.

In the first place, there will be explained the case where the FAX transmission reserving request is issued by the client 3.

Figure 8:
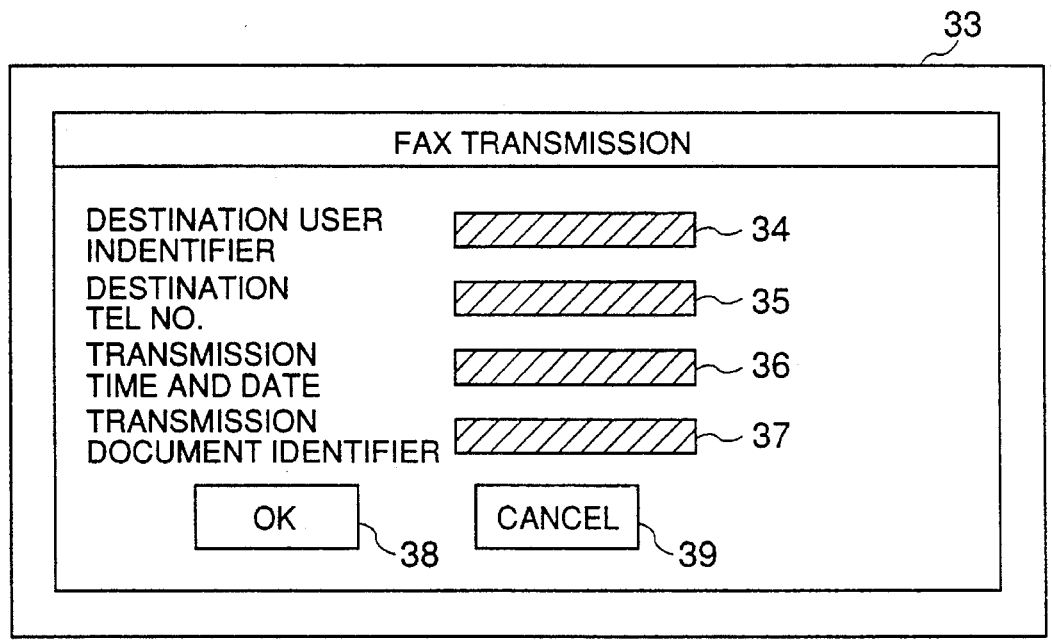
FIG. 8 is an explanatory diagram showing an example of display which is presented in order to accept an input by a client equipment.

FIG. 8 exemplifies a display for use in a transmission reserving request process which the client 3 executes.

The client 3 includes a keyboard and a pointing device, such as mouse, in addition to a display unit 33. By the way, in FIG. 8 et seq., hatched parts are display areas in which information items entered from the keyboard are echoed back. Numerals 38 and 39 in FIG. 8 indicate display buttons for accepting the pointing actions of the user through the mouse so as to start the corresponding facility, namely, the FAX transmission.

Thus, when instructed to reserve the FAX transmission by the user, the client 3 displays information indicated in FIG. 8, on the display unit 33, and it prompts the user to the key inputs of the destination user identifier 34, destination telephone No. 35, transmission time and date 36, and transmission document identifier 37. The item 36 of the transmission time and date is used for designating a transmission time, and the client 3 regards the request as one for immediate transmission when the user has given no key input for this item 36. Upon detecting the completion of the user's key inputs for the items 34~37 and the pointing or click of the OK button 38, the client 3 issues the transmission reserving request to the FAX server 1 and sends the key input information to the FAX server 1. Thereafter, it converts document data corresponding to the transmission document identifier 37, into printer control information by way of example, and it transfers the printer control information to the FAX server 1.

The communication management unit 10 of the FAX server 1 having received the FAX transmission request from the client 3 registers the user identifier having made the request for the transmission, in the transmission user identifier area 27a of the transmission document table 27 contained in the document file 15, and also registers the received key input information in the destination user identifier area 27b, destination telephone No. area 27c and transmission time and date area 27d thereof. Thereafter, it sequentially accumulates the received document data in the document data storage 30 of the document file 15. After all the received data have been accumulated, the communication management unit 10 registers the text data format in the data format area 27e of the transmission document table 27, and it also registers the accumulation start address and accumulation data size of the document data accumulated in the document data storage 30, in the data address area 27f and data size area 27g of the table 27, respectively.

Secondly, there will be explained the case where the FAX transmission reserving request is issued by the remote FAX 9.

When the remote FAX 9 has been instructed to perform the memory transmission of a handwritten document by the user, the FAX communication control unit 20 thereof issues the transmission reserving request to the FAX server 1, and it accepts the information items of the destination user identifier, destination telephone No., transmission time and date, etc. entered by the use of the operation control unit 22 and sends the accepted information items to the FAX server 1. Thereafter, it accepts through the read control unit 23 the image data of the document generated by the scanner 90, and it sequentially transfers the accepted image data to the FAX server 1.

The communication management unit 10 of the FAX server 1 having received the FAX transmission request from the remote FAX 9 executes processing similar to the processing in the case of the reception of the FAX transmission request from the client 3, and it registers the image data format in the data format area 27e of the transmission document table 27.

Lastly, there will be explained the case where the print reserving request is issued by the client 3.

Figure 9:
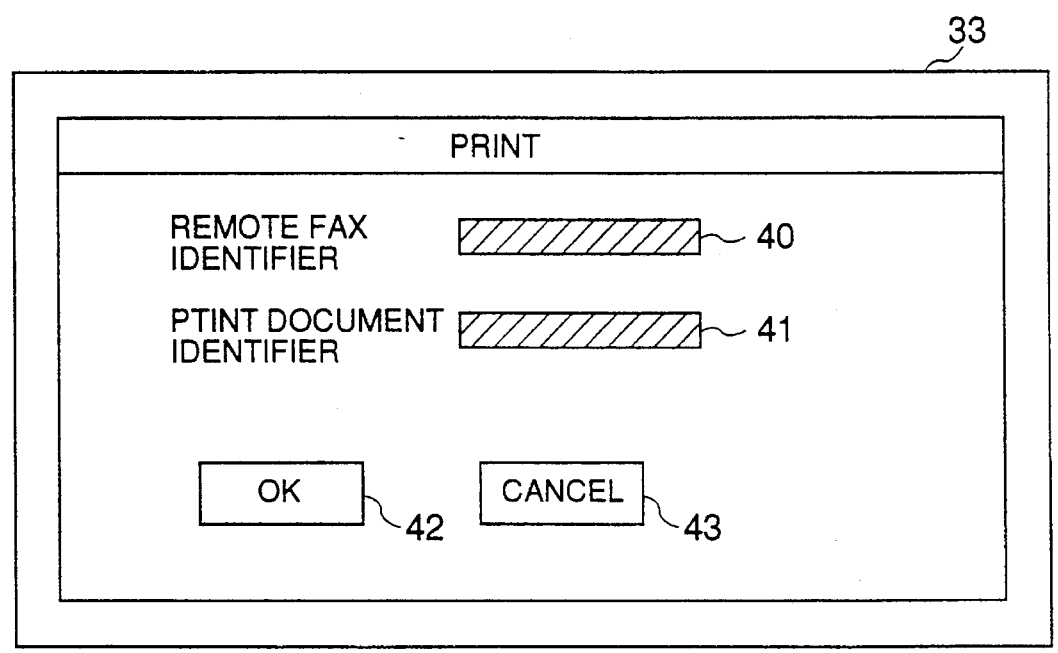
FIG. 9 is an explanatory diagram showing another example of display which is presented in order to accept an input by the client equipment.

FIG. 9 exemplifies a display for use in a print reserving request process which the client 3 executes.

When instructed to print a document by the user, the client 3 displays information indicated in FIG. 9, on the display unit 33, and it prompts the user to the key inputs of the identifier 40 of the remote FAX 9 desired to be used for the printing (this remote FAX will probably be one installed at the nearest position to the user) and the identifier 41 of the document desired to be printed. Upon detecting the completion of the user's key inputs for the items 40, 41 and the pointing or click of an OK button 42, the client 3 issues the print reserving request to the FAX server 1 and sends the key input information to the FAX server 1. Thereafter, it converts document data corresponding to the print document identifier 41, into the printer control information by way of example, and it transfers the printer control information to the FAX server 1. Incidentally, numeral 43 in FIG. 9 denotes a cancel button.

The communication management unit 10 of the FAX server 1 having received the print request from the client 3 registers the received key input information 40 in the remote FAX identifier area 29a of the print document table 29 of the document file 15. Thereafter, it sequentially accumulates the received document data in the document data storage 30 of the document file 15. After all the received data have been accumulated, the communication management unit 10 registers the text data format in the data format area 29b of the print document table 29, and it also registers the accumulation start address and accumulation data size of the document data accumulated in the document data storage 30, in the data address area 29c and data size area 29d of the table 29, respectively.

(3) Transmission/Print Request Process

When started by the time monitoring unit 14 of the FAX server 1, the communication management unit 10 thereof executes this process upon finding a document which is waiting for transmission or printing. The time monitoring unit 14 starts the communication management unit 10 every predetermined cycle (for example, at intervals of one [minute]), thereby causing the unit 10 to periodically refer to the transmission document table 27 and print document table 29 of the document file 15.

Figure 10:
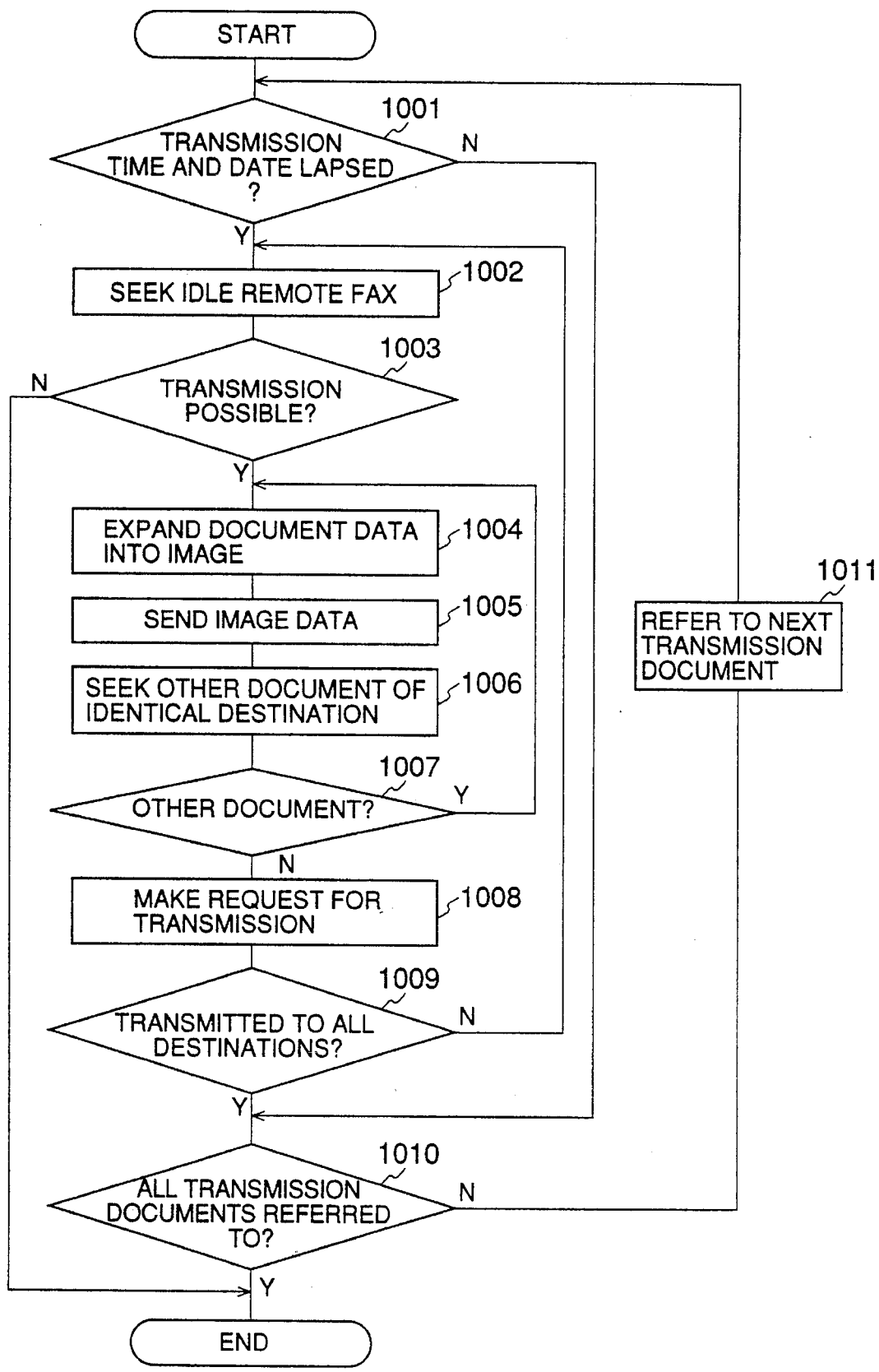
FIG. 10 is a flow chart showing the processing steps of a transmission request process which is executed by a communication management unit.

FIG. 10 is a flow chart illustrative of processing steps which the communication management unit 10 executes when started by the time monitoring unit 14.

As shown in the figure, the started communication management unit 10 initially refers to the transmission times and dates registered in the area 27d of the transmission document table 27, in succession (steps 1001, 1011). Thus, it seeks the document whose transmission time and date have lapsed (the registered transmission time and date are earlier than the present time).

In a case where, at the step 1001, the communication management unit 10 has found the document of the lapsed transmission time and date or the document for the immediate transmission, it refers to the status table 18 and selects one of the usable FAXes 9 (step 1002).

More specifically, at the step 1002, the communication management unit 10 first seeks the remote FAXes 9 for which the operating level #0 expressive of the "standing by" status is registered, by referring to the statuses in the area 18b of the status table 18 in succession. In the absence of the remote FAX 9 which is standing by, the communication management unit 10 subsequently seeks the remote FAXes 9 for which the operating level #1 expressive of the "standing by for retry transmission" status is registered. In the absence of the remote FAX 9 which is standing by or which is standing by for retry transmission (step 1003), the communication management unit 10 judges that all the remote FAXes 9 are operating, and it ends the process.

On the other hand, in the presence of the remote FAX 9 which is standing by or which is standing by for retry transmission (step 1003), the communication management unit 10 of the FAX server 1 commands the data conversion unit 11 thereof to expand the document data into an image (step 1004). The commanded data conversion unit 11 first creates the image data of a FAX transmission form (cover sheet) by using the information items of the transmission user identifier, destination user identifier etc. registered in the respective areas 27a, 27b etc. of the transmission document table 27. The created image data are expanded in the image memory 16.

Subsequently, the data conversion unit 11 reads out the document data accumulated in the document data storage 30, by using the data address and data size registered in the respective areas 27f and 27g of the transmission document table 27. In the case where the text data format is registered in the data format area 27e, bitmap information corresponding to each character code or graphic code is extracted from the font memory 17 of the FAX server 1 and is expanded at the predetermined position of the image memory 16 thereof. In contrast, in the case where the image data format is registered in the data format area 27e, the document data read out are directly expanded in the image memory 16.

After the data conversion unit 11 has ended the image expansion, the communication management unit 10 sends the image data expanded in the image memory 16, to the remote FAX 9 sought and found at the step 1002 (step 1005). After having sent all the image data, the communication management unit 10 checks if there is any other document directed to the same destination as that of the document sent just, by referring to the transmission document table 27 (step 1006). In the presence of the document of the same destination, the image expansion processing of the step 1004 et seq. is iterated (step 1007). In a case where, at the step 1007, the communication management unit 10 decides that all the documents of the identical destination have been expanded into images and then transferred, it sends the remote FAX 9 the destination telephone No. in the area 27c of the transmission document table 27, thereby making the request for the FAX transmission (step 1008).

On the other hand, the FAX communication control unit 20 of the remote FAX 9 having been requested to transmit the image data connects this remote FAX 9 with the opposite FAX 6 through the public switched network 5 by the use of the received destination telephone No. Then, it negotiates a transmission document size, a resolution, a transmission coding method, etc. with the opposite FAX 6 in conformity with the FAX protocol. Thereafter, it transmits the image data received from the FAX server 1 and accumulated in the pictorial image file 25 of the remote FAX 9, as a collective document for one communication.

Subsequently, the communication management unit 10 of the FAX server 1 having requested the remote FAX 9 to transmit the image data at the step 1008 checks if there is any other broadcast destination to which the document pertinent to the transmission request made just before has not yet been transmitted (step 1009), by referring again to the destination telephone No. area 27c of the transmission document table 27 for the pertinent document. That is, in a case where a plurality of destination telephone Nos. are set in the area 27c for the pertinent document, the communication management unit 10 checks if the transmission requests have been made for all the set destinations. In the presence of the destination to which the document has not yet been transmitted, the communication management unit 10 iterates the processing of the step 1002 et seq. and requests another of the remote FAXes 9 to transmit the document.

After the communication management unit 10 has executed the above processing for all the documents registered in the transmission document table 27 (steps 1010, 1011), it shifts to the following print request process:

In the print request process, the communication management unit 10 first derives the remote FAX identifier registered in the area 29a of the print document table 29, and it checks if the corresponding remote FAX 9 designated for printing the document by the user is usable, by referring to the status area 18b of the status table 18.

Here, in a case where the operating level #2 expressive of the "operating" status is registered in the status area 18b, the communication management unit 10 iterates the same processing for the next print document.

On the other hand, in a case where the operating level #0 of the "standing by" status or the operating level #1 of the "standing by for retry transmission" status is registered in the status area 18b, the communication management unit 10 commands the data conversion unit 11 to expand the document data into an image. The commanded data conversion unit 11 reads out the document data accumulated in the document data storage 30, by using the data address and data size registered in the respective areas 29c and 29d of the print document table 29. In the case where the text data format is registered in the data format area 29b, bitmap information corresponding to each character code or graphic code is extracted from the font memory 17 and is expanded at the predetermined position of the image memory 16. In contrast, in the case where the image data format is registered in the data format area 29b, the document data read out are directly expanded in the image memory 16.

Thereafter, when the data conversion unit 11 has ended the image expansion, the communication management unit 10 sends the remote FAX 9 the image data expanded in the image memory 16. The FAX communication control unit 20 of the remote FAX 9 having been requested to perform the printing operates to print the image data received from the FAX server 1 and accumulated in the pictorial image file 25 of the remote FAX 9, on recording paper by means of the printer 91 through the record control unit 24. In due course, the communication management unit 10 ends its operation after it has executed the above processing for all the documents registered in the print document table 29.

(4) Sorting Transmission Process

The communication management unit 10 of the FAX server 1 executes this process upon receiving a sorting transmission request from the remote FAX 9. The "sorting transmission request" is a request in which, when instructed by the user to immediately transmit a handwritten document to a certain destination, the remote FAX 9 inquires of the FAX server 1 about the presence of any transmission document directed to the same destination. With the issue of the sorting transmission request, the FAX communication control unit 20 of the remote FAX 9 notifies the FAX server 1 of a destination telephone No. which the user has entered through the operation control unit 22.

The communication management unit 10 of the FAX server 1 having received the sorting transmission request made by the remote FAX 9 searches the transmission document table 27 whose area 27c contains the same destination telephone No. as that received from the remote FAX 9. In the presence of the document bearing the same destination, the communication management unit 10 executes the processing of the image expansion of the document data of the above document accumulated in the document data storage 30 and the transfer of the resulting image data of the document data, likewise to the processing of the steps 1004 thru 1008 shown in FIG. 10.

The FAX communication control unit 20 of the remote FAX 9 having received the image data of the document data from the FAX server 1 connects this remote FAX 9 with the opposite FAX 6 through the public switched network 5 by the use of the destination telephone No. which the user has entered. In this state, it first transmits the image data of the handwritten document read through the read control unit 23, to the opposite FAX 6. Subsequently, it transmits the image data received from the FAX server 1 and accumulated in the pictorial image file 25, to the opposite FAX 6.

(5) Activity Stop Process

When instructed to stop the activity of the FAX server 1 by the user, the communication management unit 10 thereof executes this process. In this process, the unit 10 requests the remote FAX 9 to transmit image data at an appointed time, by transferring thereto the image data of document data the registered transmission time and date of which fall within the time period of the activity stop.

In the case where the communication management unit 10 has been instructed to stop the activity of the FAX server 1 through the keyboard or the like of the FAX server 1, it displays information for prompting the user to the input of the next time and date scheduled to start the activity, on the display unit 33 of the FAX server 1.

Subsequently, the communication management unit 10 checks if there is any document which received from opposite Faxes 6 scheduled to be transmitted during the activity stop time period, by the comparison between the time and date scheduled to start the activity as keyed by the user and the transmission time and date registered in the area 27d of the transmission document table 27. In the presence of the document, the communication management unit 10 converts the document data accumulated in the document data storage 30, into the image data and transfers the image data to the remote FAX 9, by processing similar to the steps 1002 thru 1009 shown in FIG. 10. On this occasion, the communication management unit 10 sends the transmission time and date in the area 27d of the transmission document table 27 simultaneously and makes the appointed-time transmission request of the remote FAX 9.

After the above processing has been executed for all the documents which are scheduled to be transmitted during the activity stop time period, the activity of the FAX server 1 is stopped. The FAX communication control unit 20 of the remote FAX 9 having been requested to transmit the image data at the appointed times operates to accumulate the image data of the received documents in the pictorial image file 25, and to transmit the corresponding image data to the opposite FAXes 6 when the appointed times have come.

During the activity stop time period of the FAX server 1, the remote FAX 9 accumulates the image data of received documents in the image file 25. Besides, in a case where the image file 25 has become full, the record control unit 24 of the remote FAX 9 operates to print the received documents using the printer 91. Besides, when the remote FAX 9 has been instructed to perform FAX transmission directly by the user, the read control unit 23 thereof accepts the image of the document from the scanner 90, and the FAX communication control unit 20 thereof transmits the image data to the opposite FAX 6.

In the above, the transmission/print operation of the facsimile server system in this embodiment has been explained.

As thus far explained, according to this embodiment, the FAX server 1 expands into the image the document data which the user has created using the application of the client 3. Thereafter, it transfers the image to the remote FAX 9 via the LAN 4 and makes the request for the FAX transmission or the printing. On the other hand, the FAX communication which requires real-time processing is dealt with by the remote FAX 9, so that the FAX server 1 may perform only the image expansion processing. In general, the data transmission speed of the LAN 4 is sufficiently higher than that of the public switched network 5. Accordingly, the image expansion of the FAX server 1 may be processed at or above the transmission speed of the public switched network 5 and need not be high-speed processing. Therefore, according to this embodiment, the information processor such as PC (personal computer) or WS (work station) which is to operate as the FAX server 1 and which holds the FAX server programs resident in the main storage area thereof becomes capable of the parallel running of other business application programs etc. which the user uses. Thus, the information processor such as PC or WS can be efficiently utilized.

Moreover, while normally monitoring the statuses of the individual remote FAXes 9, the FAX server 1 in this embodiment automatically selects the idle one of the plurality of remote FAXes 9 arranged in the LAN 4 and requests the idle remote FAX 9 to transmit the image data, so that the FAX communication facilities of all the remote FAXes 9 can be efficiently utilized. Besides, the FAX server 1 requests the remote FAX 9 in the "standing by for retry transmission" status to transmit the image data only in the absence of the remote FAX 9 in the "standing by" status, and it usually requests the standing-by remote FAX 9 not scheduled for transmission within a short time, to transmit the image data. Therefore, the retry transmission operation of the remote FAX 9 is rarely delayed.

Further, the FAX server 1 in this embodiment can transmit the identical document to a large number of different destinations at once in response to a broadcast request, using the plurality of remote FAXes 9 arranged in the LAN 4. Therefore, a total processing time period required for the broadcast can be sharply shortened.

Still further, the remote FAX 9 in this embodiment has the sorting transmission facility in which, when instructed to immediately transmit the handwritten document by the user, this remote FAX derives the transmission document directed to the identical destination, from among the documents accumulated in the FAX server 1, and transmits the image data of the transmission document to the opposite FAX 6 along with those of the read handwritten document in collective fashion. Besides, when instructed to perform the memory transmission of the handwritten document by the user, the remote FAX 9 transfers the image data of the read handwritten document to the FAX server 1 and makes the request for the transmission. In the case where the transmission document directed to the identical destination is held accumulated, the FAX server 1 having accepted the transmission request transfers the image data of the transmission documents to one of remote FAXes 9 and requests this remote FAX 9 to collectively transmit the image data of the documents to the opposite FAX 6. A communication fee can be curtailed owing to the sorting transmission facility of transmitting the plurality of documents to the identical destination at one time in this manner.

Figure 2:
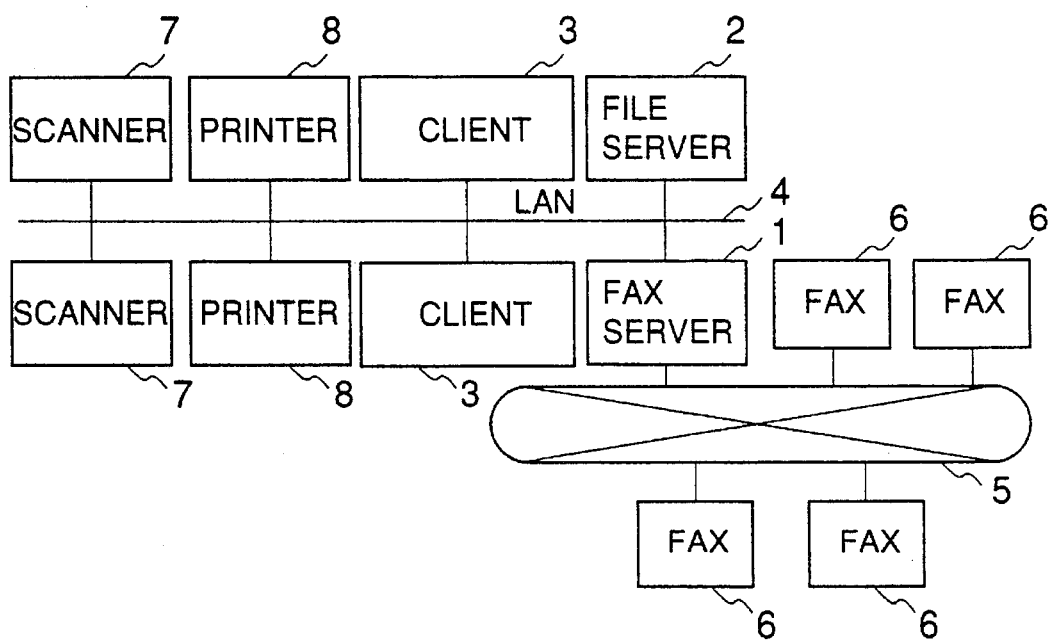
FIG. 2 is a block diagram showing the construction of a facsimile server system in the prior art.

Meanwhile, the FAX server (1 in FIG. 2) in the prior art needs to have its power source normally turned ON in order to perform the appointed-time transmission during the nighttime etc. when it is inexpensive to carry out communications. However, when the information processor such as PC constituting the FAX server has its power source normally turned ON, the useful life of the external storage unit thereof such as an HDD (hard disk drive) shortens drastically. In contrast, according to this embodiment, when the FAX server 1 is to have its activity stopped, it transfers the document data scheduled to be transmitted during the activity stop, to the remote FAXes 9 and then requests these remote FAXes 9 to transmit the document data to the opposite FAXes 6 at the appointed times thereof. Accordingly, even in the case where the FAX server 1 is scheduled for the appointed-time transmission, the power source thereof can be turned OFF, so that the lifetime of the information processor constituting the FAX server 1 can be prolonged.

In the foregoing, the user's operation of reserving the transmission has been explained as the operation of keying the destination user identifier 34 and the destination telephone No. 35 in the client 3 as illustrated in FIG. 8. Alternatively, the FAX server 1 may well be provided with a destination registration file in which dial information items are registered for the respective users. Herein, the destination registration file is so constructed that the identifiers and telephone Nos. of transmission destinations to which the user frequently transmits documents from the client 3 can be registered beforehand. When the user reserves the transmission, the client 3 receives the contents of the destination registration file from the FAX server 1 and displays the list of the identifiers and telephone Nos. of the transmission destinations on the display unit 33. Subsequently, the client 3 transfers the transmission destination selected from within the destination list by the user, to the FAX server 1 simultaneously with the issue of a transmission reserving request.

Now, the reception/read operation of the facsimile server system in this embodiment will be explained.

2. Reception/Read Operation

The FAX server 1 performs an activity start process, a reception transfer process and a document retrieval process as processes concerning the reception/read operation. The details of the individual processes will be explained below.

(1) Activity Start Process

This is a process in which, at the turn-ON of the power source of the information processor such as PC or WS operating as the FAX server 1, the communication management unit 10 derives document data that have been received by the remote FAXes 9 and accumulated in the pictorial image file 25 during the activity stop time period of the FAX server 1.

Figure 11:
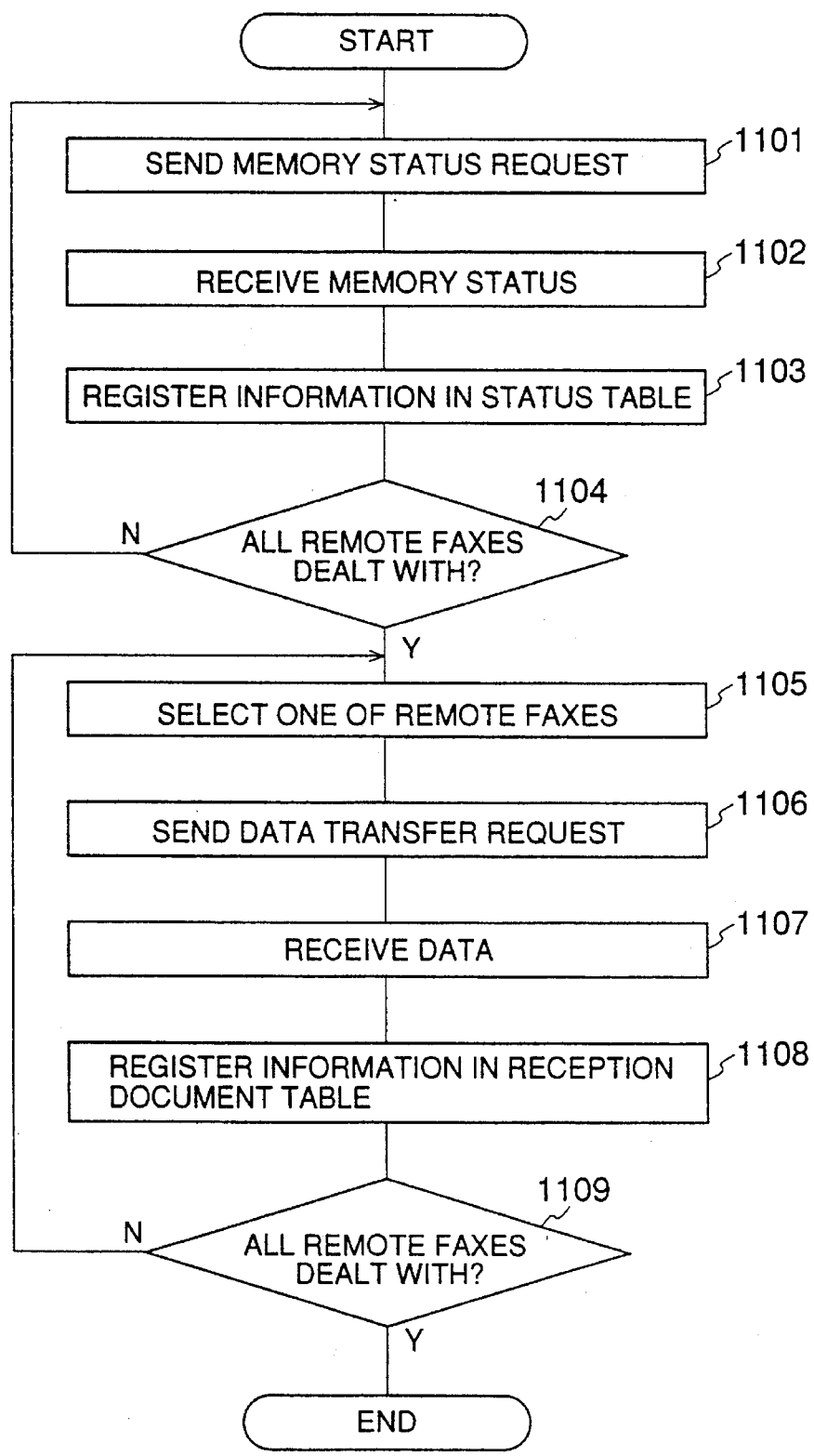
FIG. 11 is a flow chart showing the processing steps of an activity start process which is executed by the communication management unit.

The steps of this process are illustrated in FIG. 11.

As shown in the figure, when the FAX server 1 is to start its activity owing to the turn-ON of the power source thereof, the communication management unit 10 refers to the remote FAX identifier area 18a of the status table 18 and sends information for a memory status request, to the remote FAX 9 registered first (step 1101).

The FAX communication control unit 20, of the remote FAX 9 having received the memory status request, reports the unused or remaining storage capacity of the image file 25 to the FAX server 1.

The communication management unit 10 of the FAX server 1 having received the memory status at a step 1102 registers the reported unused storage capacity of the image file 25 in the remaining image-file capacity area 18c of the status table 18 (step 1103). Thereafter, it iterates the processing of the steps 1101 thru 1103 for the other remote FAXes 9 (step 1104).

When the communication management unit 10 has received the memory statuses of all the remote FAXes 9 arranged in the LAN 4 and has registered them in the remaining image-file capacity area 18c of the status table 18, it selects one of the remote FAXes 9 to which the received document data are to be transferred first (step 1105). The criterion for the selection is the value of the remaining storage capacity of the image file 25 registered in area 18c, and the remote FAX 9 corresponding to the smallest value shall be selected first.

Subsequently, the communication management unit 10 erases the remaining image-file capacity registered in the area 18c in correspondence with the selected remote FAX 9 and sends information for making a request for the transfer of the received document data (step 1106).

The FAX communication control unit 20 of the remote FAX 9 having received the data reception request derives the received document data from the image file 25, and sends them to the FAX server 1 sequentially. In addition, the FAX communication control unit 20 sends information items on the identifier of a transmission side user and the reception time and date of the pertinent transmission, along with the received document data. Here, the identifier of the transmission side user is obtained in such a way that the remote FAX 9 extracts information received within the FAX protocol from the transmission side FAX 6. Such information is contained in, for example, a transmission subscriber identification (TSI) signal in the protocol of G3 FAX (group 3 type facsimile).

The communication management unit 10 of the FAX server 1 accumulates all the received document data in the document data storage 30 (step 1107). Thereafter, the communication management unit 10 registers the identifier of the remote FAX 9 from which the document data have been received, in the reception remote FAX area 28b of the reception document table 28, and also the accumulation start address and accumulation data size of the document data accumulated in the document data storage 30, in the data address area 28e and data size area 28f of the table 28, respectively. Further, it registers the serial No. of the document of the received document data in the document No. area 28a of the table 28, and also the information items of the identifier of the transmission side user and the time and date of the reception as received from the remote FAX 9 along with the document data, in the transmission user identifier area 28c and the reception time and date area 28d of the table 28, respectively (step 1108). Subsequently, the communication management unit 10 iterates the processing of the steps 1105 thru 1108 for the other remote FAXes 9 (step 1109) until the received document data are transferred from all the remote FAXes 9 arranged in the LAN 4. Then, the FAX server 1 falls into a real active status. The "real active status" is intended to mean that status of the FAX server 1 in which any process other than the activity start process can be executed. That is to say, the FAX server 1 is inhibited from executing any other process till the end of the activity start process since the turn-ON of the power source.

(2) Reception Transfer Process

The communication management unit 10 of the FAX server 1 executes this process upon receiving document data from the remote FAX 9.

When the FAX communication control unit 20 of the remote FAX 9 has received the document data from the opposite FAX 6 via the public switched network 5, or when it has read a handwritten document by means of the scanner 90 through the read control unit 23 in compliance with the user's instruction for a simple scanner read operation, it accumulates the received document data or the data of the read document temporarily in the pictorial image file 25. Thereafter, it derives the document data from the image file 25 and sends them to the FAX server 1 sequentially. In the case of transferring a FAX reception document, the FAX communication control unit 20 sends information items on the identifier of a transmission side user and the time and date of the reception, along with the document data.

After having accumulated the received document data in the document data storage 30 sequentially, the communication management unit 10 of the FAX server 1 registers the identifier of the remote FAX 9 in the reception remote FAX area 28b of the reception document table 28, and also the accumulation start address and accumulation data size of the document data accumulated in the document data storage 30, in the data address area 28e and data size area 28f of the table 28, respectively. Further, it registers the serial No. of the document in the document No. area 28a of the table 28, and also the identifier of the transmission side user and the time and date of the reception as received along with the document data, in the transmission user identifier area 28c and the reception time and date area 28d of the table 28, respectively.

(3) Document Retrieval Process

The communication management unit 10 executes this process upon receiving a request for retrieving any accumulated document from the client 3.

Figures 12A, 12B:
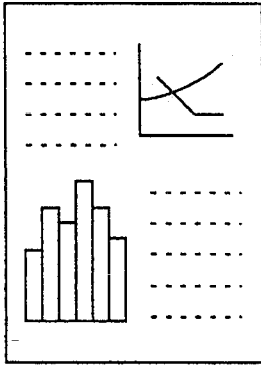
FIGS. 12(a) and 12(b) are explanatory diagrams showing display examples which are presented in order ,to accept inputs by the client equipment.

FIGS. 12(a) and 12(b) exemplify displays for use in accepting the user's inputs in the document retrieval process which is executed by the client 3.

When instructed to retrieve the accumulated document by the user, the client 3 displays information items as shown in FIG. 12(a), on the display unit 33, and it prompts the user to key or enter a remote FAX identifier into a display area 44. Subsequently, it notifies the FAX server 1 of the entered remote FAX identifier.

The communication management unit 10 of the FAX server 1 notified of the remote FAX identifier retrieves the received document bearing the notified remote FAX identifier, by referring to the reception remote FAX area 28b of the reception document table 28. Subsequently, it sends back the contents of the document No. area 28a, transmission user identifier area 28c and reception time and date area 28d of the table 28 to the client 3.

The client 3 generates a FAX reception list 45 by the use of the information items received from the FAX server 1, and displays the list 45 on the display unit 33. Thereafter, it prompts the user to key or enter a document No. into a display area 46, and it notifies the FAX server 1 of the entered document No. Incidentally, numeral 47 in FIG. 12(a) denotes a cancel button which is pointed to or clicked for canceling the document retrieval process.

As shown in FIG. 12(b), the client 3 displays the transferred document data on the display unit 33 in the form of image data 48, and it waits for the pointing or click of an OK button 49, a cancel button 50 or a next-page button 51. Herein, when the client 3 has detected the pointing of the OK button 49, it files the received document data and saves the file in the storage device of its own, such as an HD (hard disk) or an FD (flexible disk). On the other hand, when it has detected the pointing of the next-page button 51, it displays the received document data concerning the next page, on the display unit 33 as the image data 48. Besides, when it has detected the pointing of the cancel button 50, it reverts to the display image shown in FIG. 12(*a*) and prompts the user to reenter the document No. into the display area 46.

In the above, the reception/read operation in this embodiment has been explained.

As thus far explained, according to this embodiment, the remote FAX 9 transfers the image data received from the opposite FAX 6 via the public switched network 5 in conformity with the FAX protocol or the image data read through the scanner 90, to the FAX server 1 via the LAN 4. Then, the FAX server 1 accumulates and manages the transferred image data separately for the individual remote FAXes 9. Therefore, when the user retrieves the desired document, the user need not search all the documents accumulated in the FAX server 1, but it may search only the documents received by the remote FAX 9 which corresponds to the telephone No. notified to the transmission side users.

Further, the FAX server 1 in this embodiment causes the remote FAXes 9 to transfer document data thereto at the start of its activity, the document data having been received from the opposite FAXes 6 and accumulated in the pictorial image files 25 by these remote FAXes 9 during a specified time period, for example, in the nighttime or on a holiday. On this occasion, the FAX server 1 causes the remote FAXes 9 to transfer the received document data thereto, successively from the remote FAX 9 which has the smallest idle or remaining capacity. Therefore, the remote FAX 9 which is incapable of reception due to, for example, the full status of the image file 25 can be made capable of the reception at the earliest opportunity.

Now, the parameter processing operation of the facsimile server system in this embodiment will be explained.

3. Parameter Processing Operation

The FAX server 1 in this embodiment performs a parameter transfer process, a dial registration process and a communication history reference process as processes concerning the parameter processing operation. The details of the individual processes will be explained below.

(1) Parameter Transfer Process

The parameter management unit 12 of the FAX server 1 executes this process upon receiving a start request from the time monitoring unit 14 thereof. The time monitoring unit 14 starts the parameter management unit 12 every predetermined cycle (for example, at intervals of one [hour]), thereby periodically collecting the contents of the parameter tables 26 of the individual remote FAXes 9 into the parameter file 19 of the FAX server 1.

More specifically, the parameter management unit 12 having received the start request from the time monitoring unit 14 refers to the remote FAX identifier area 18*a* of the status table 18 and sends an instruction making a request for the transfer of parameters, to the remote FAX 9 registered first. The operation control unit 22 of the remote FAX 9 having received the parameter transfer request transfers to the FAX server 1 the stored contents of the parameter table 26, namely, the registered data of the abbreviation or one-touch dialing and communication history data which express communication modes, opposite user identifiers, the numbers of sheets of communications and the results of the communications with the opposite FAXes 6.

The parameter management unit 12 of the FAX server 1 registers the received parameters in the dial information table 31 and communication management table 32 of the parameter file 19 in correspondence with the aforementioned remote FAX 9. Thereafter, the above processing is iterated for the other remote FAXes 9.

By the way, the operation control unit 22 of the remote FAX 9 transfers to the FAX server 1 the registered data of the abbreviation or one-touch dialing stored in the parameter table 26, not only in the case where this remote FAX 9 has received the parameter transfer request, but also in a case where the user has registered or altered the data of the abbreviation or one-touch dialing through the operation panel of the remote Fax 9. The parameter management unit 12 of the FAX server 1 registers the received parameter in the dial information table 31 and the communication management table 32 in correspondence with the remote FAX 9 pertinent to the parameter.

(2) Dial Registration Process

The parameter management unit 12 of the FAX server 1 executes this process upon receiving a request for the registration of abbreviation or one-touch dialing as directed from the client 3 to the remote FAX 9.

FIG. 13 exemplifies a display which is presented by the client 3 and which is used for accepting the user's inputs in the dial registration process.

When instructed by the user to register the abbreviation or one-touch dialing in the remote FAX 9, the client 3 displays information items as shown in FIG. 13, on the display unit 33, and it prompts the user to key or enter a remote FAX identifier, a registration No., a destination user identifier and a destination telephone No. into display areas 52, 53, 54 and 55, respectively. The registration No. in the area 53 is that No. of the abbreviation or one-touch dialing which is to be registered in the remote FAX 9 identified in the area 52, in correspondence with the destination user identifier in the area 54 and the destination telephone No. in the area 55. The user points to or clicks an OK button 56 after completing the key inputs into the areas 52 thru 55. The client 3 having detected the pointing of the OK button 56 transfers the key input information items to the FAX server 1. Incidentally, numeral 57 in the figure denotes a cancel button for canceling the dial registration process.

The parameter management unit 12 of the FAX server 1 registers the received key input information items in the registration No. area 31*b*, destination user identifier area 31*c* and destination telephone No. area 31*d* of the dial information table 31, and thereafter transfers the registered information items to the specified remote FAX 9. The operation control unit 22 of the remote FAX 9 writes the received dial information items into the parameter table 26, and registers them as the abbreviation or one-touch dialing data. Thenceforth, the remote FAX 9 accepts the operation of transmission to the corresponding destination telephone No. in terms of the registered abbreviation or one-touch dialing No., directly from the user or through the FAX server 1. Besides, it operates to display the corresponding destination user identifier for the sake of verification.

(3) Communication History Reference Process

The parameter management unit 12 of the FAX server 1 executes this process upon receiving a request for reference to communication history information from the client 3.

FIG. 14 illustrates an example of display which is presented by the client 3 and which is used for accepting the user's inputs in the process for the reference to the communication history information.

When instructed to refer to the communication history information by the user, the client 3 displays information items as shown in FIG. 14, on the display unit 33, and it prompts the user to key or enter a remote FAX identifier into a display area 58. It notifies the FAX server 1 of the entered remote FAX identifier.

The parameter management unit 12 of the FAX server 1 notified of the remote FAX identifier retrieves the communication history information bearing the notified remote FAX identifier, by referring to the remote FAX area 32a of the communication management table 32. Subsequently, it sends back to the client 3 the contents of the communication mode area 32b, opposite user identifier area 32c, number-of-sheets area 32d and result-of-communication area 32e as collected by the parameter transfer process stated before.

The client 3 generates a FAX transmission history report 59 and a FAX reception history report 60 by the use of the information items received from the FAX server 1, and displays the generated reports on the display unit 33.

Besides, in a case where the user has keyed information, for example, "all" expressive of all the remote FAXes 9 as the remote FAX identifier in the area 58, the client 3 requests the FAX server 1 to transfer the communication history information concerning all the remote FAXes 9. Thereafter, the client 3 generates the FAX transmission history report 59 and FAX reception history report 60 of the whole facsimile server system by the use of the information items received from the FAX server 1 and displays the generated reports on the display unit 33. Incidentally, numeral 61 in the figure denotes an OK button for approving the remote FAX identifier in the area 58.

In the above, the parameter processing operation has been explained.

As thus far explained, according to the facsimile server system of this embodiment, the FAX server 1 periodically collects the destination data of the abbreviation or one-touch dialing or the like registered in the parameter tables 26 of the respective remote FAXes 9 and manages them as the data to-be-saved. For this reason, even when the information items registered in the parameter table 26 of any of the remote FAXes 9 have been destroyed due to, for example, the abnormality of the storage device, they can be recovered with ease. Moreover, the abbreviation or one-touch dialing information items of all the remote FAXes 9 arranged in the LAN 4 can be made the same in such a way that the destination data saved in the dial information table 31 of the parameter file 19 of the FAX server 1 are distributively transferred to the remote FAXes 9. Further, even in a case where at least one remote FAX 9 has been added to the facsimile server system of this embodiment anew, the destination data of the abbreviation or one-touch dialing or the like can be registered merely by sending the new remote FAX 9 the destination data saved in the dial information table 31 of the parameter file 19 of the FAX server 1.

Meanwhile, an ordinary FAX has an operation panel which is configured of a small-sized display unit and a numerical-key pad. Therefore, the operation of the operation panel is very troublesome in the case of entering a destination user identifier in the Japanese language in, for example, the task of registering abbreviation or one-touch dialing information. On the other hand, according to the facsimile server system of this embodiment, the abbreviation or one-touch dialing information of the remote FAX 9 can be registered through the client 3. In general, the information processor constituting the client 3, such as PC, includes the keyboard which is configured of the large-sized display unit and alphanumeric keys. Therefore, the entry of information in the Japanese language is easy, and a task time required for the user's operation of registering the abbreviation or one-touch dialing information can be shortened.

In addition, the FAX server 1 of this embodiment has the facility of periodically collecting the communication history information items of the individual remote FAXes 9 and creating the communication management report of the whole facsimile server system as shown in FIG. 14. Therefore, the user who manages the facsimile server system of this embodiment can readily grasp the frequency of use of the FAXes, etc. in the whole of his/her own office.

As stated above, the facsimile server system in this embodiment relieves the processing load of the FAX server 1 in such a way that the plurality of remote FAXes 9 take partial charges of the processing of the communications with the opposite FAXes 6 through the public switched network 5. Besides, the facsimile server system offers the same simple operability as in the conventional FAX to the user who desires to transmit a handwritten document. Further, since the remote FAX 9 can be utilized instead of the scanner (7 in FIG. 2) and the printer (8) in the prior art, the cost and installation space of the client/server system can be reduced.

Now, the FAX server 1 can accept FAX transmission reserving requests from various servers, likewise to the FAX transmission reserving requests from the client 3.

Figure 15:
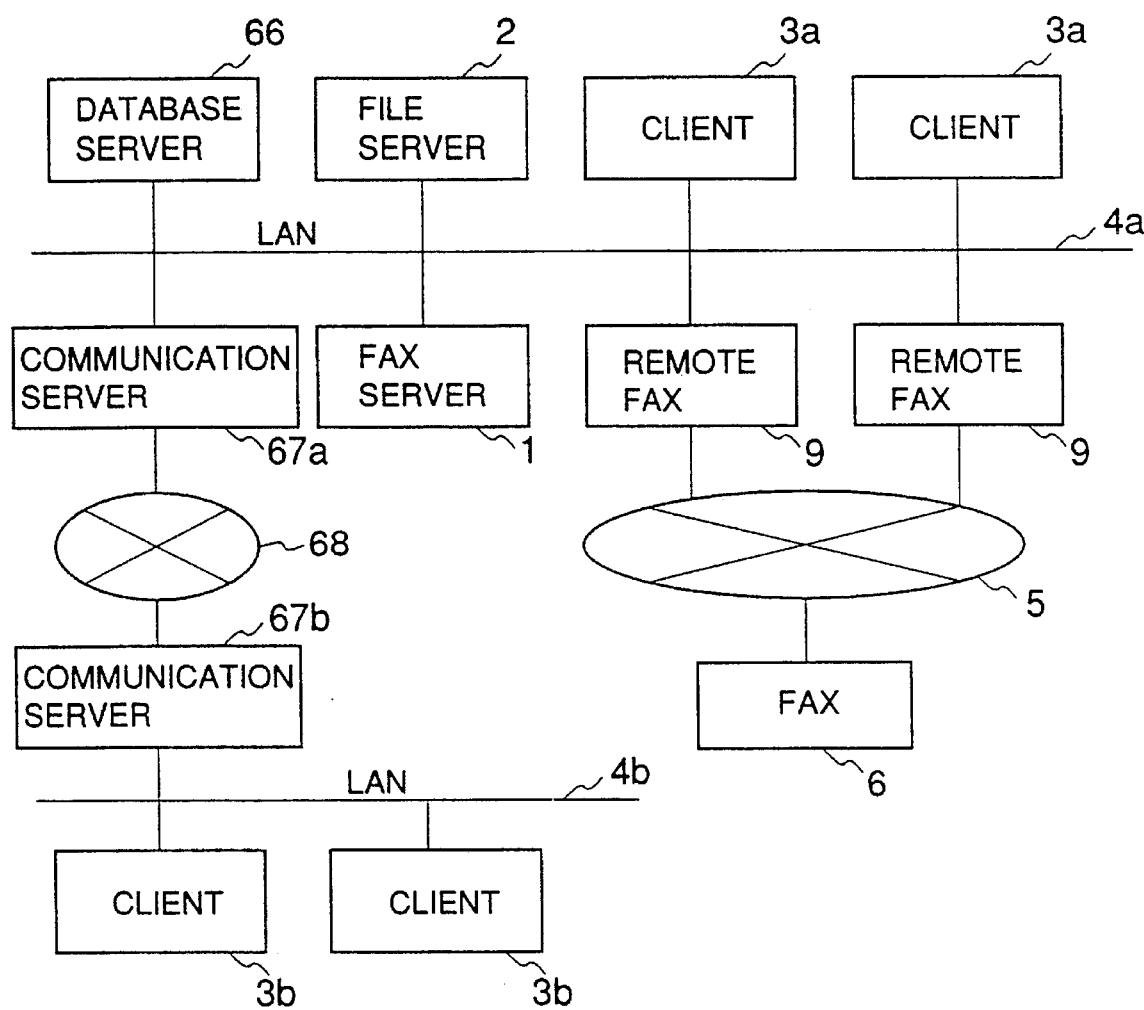
FIG. 15 is a block diagram showing an example of construction of a facsimile server system in another embodiment of the present invention.

FIG. 15 illustrates a client/server system which includes a database management system, as another embodiment of the present invention.

Referring to the figure, numeral 66 indicates a database server which manages a database such as a relational database. Symbols 67a and 67b denote communication servers which connect LAN's 4a and 4b through a private switched network 68.

The user of the client/server system on the side of the LAN 4a enters data, for example, information on the stock of goods from a client 3a so as to register them in the database server 66. On the other hand, the user of the system on the side of the LAN 4b accesses the distant database server 66 via the communication servers 67b and 67a from a client 3b. The user of the client 3b having logged into the database server 66 retrieves and derives the stock information registered in the database server 66, and he/she displays the derived information on the display unit of the client 3b for the purpose of verification.

Heretofore, the user on the LAN-4a side has notified the user on the LAN-4b side of the fact that the data have been entered and can be utilized, by telephone or the like after having entered the data into the database server 66. With the telephone, however, the user on the LAN-4b side cannot be notified in such a case where he/she is absent, and the fact of the notification cannot be left as a record, either. Therefore, some users have transmitted written notifications by means of stand-alone FAXes. The FAX transmission which must be performed each time the data have been entered into a database, has been a burden on the user who needs to frequently carry out the database input operations.

In this embodiment, therefore, whenever data have been entered into the database, a notification is automatically transmitted as the FAX transmission.

In the embodiment shown in FIG. 15, the database server 66 is endowed with the trigger facility of executing a predefined process upon the occurrence of a certain event. More specifically, in a case where data have been entered into a certain database table, the database server 66 in this embodiment requests the FAX server 1 to transmit a document of definite form for notifying the completion of the data input operation, to an opposite (opposite-party) FAX 6 of at least one predetermined FAX No.

By way of example, when the user on the side of the LAN 4a has instructed the database server 66 to register the input data in the database, from the client 3a, the database server 66 registers the received input data in the corresponding database table of the database. When the registration has been completed, the trigger facility is started, and the database server 66 executes the process conforming to contents defined as the trigger facility. That is, the database server 66 issues the FAX transmission request to the FAX server 1, and it generates document data for notifying the completion of the data input operation and transfers them to the FAX server 1 along with one or more preset destination FAX Nos.

The FAX server 1 having accepted the FAX transmission reserving request from the database server 66 deals with this request in the same manner as in the case of the reception of the transmission reserving request from the client 3. That is, the FAX server 1 expands the document data into image data and transfers the image data to a remote FAX 9. Then, the remote FAX 9 converts the transferred image data into data in the data format of the opposite FAX 6 and thereafter transmits the resulting data to the opposite FAX 6 via a public switched network 5 in conformity with a FAX protocol.

On the other hand, the user on the side of the LAN 4b recognizes the completion of the data input operation owing to the operation completion notifying document which the opposite FAX 6 delivers. If necessary, he/she accesses the distant database server 66 via the communication servers 67b and 67a from the client 3b and obtains desired data.

In this manner, when the data have been entered into the database, the document for notifying the completion of the data input operation can be automatically transmitted to the predetermined destination by the remote FAX 9. It is therefore possible to relieve the labor and burden of the user who enters the data into the database. It is also possible to manage the history of the operations of entering data into the database, by keeping such notifying documents in custody.

Figure 16:
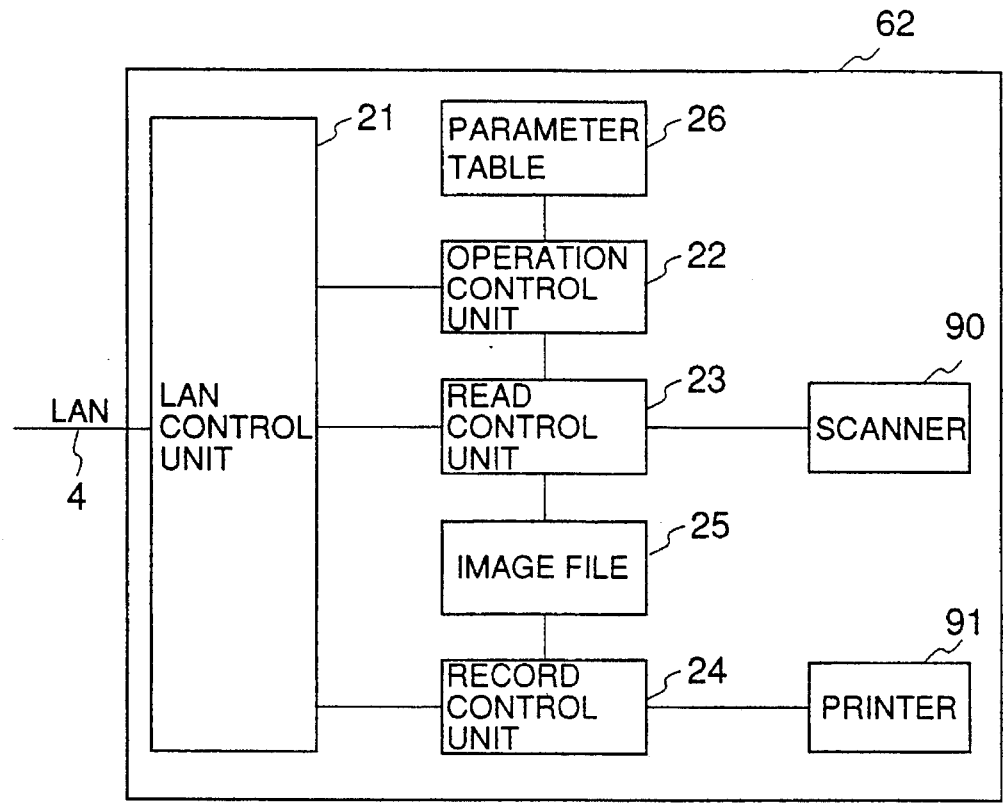
FIG. 16 is a block diagram showing the constituent layout of a pictorial image input/output device in an embodiment of the present invention.

Meanwhile, the remote FAX 9 functions as the scanner (90 in FIG. 4), the printer (91) and the very FAX as explained before. Within the office, however, pictorial image I/O (input/output) devices 62 each of which does not include the FAX communication control unit (20) as seen from FIG. 16 may be arranged in suitable places.

The pictorial image I/O device 62 transfers the image data of a handwritten document read through the read control unit 23, to the FAX server 1 along with a destination telephone No. entered through the operation control unit 22. In accordance with the transmission request process shown in FIG. 10, the FAX server 1 having received the image data etc. selects the remote FAX 9 including the FAX communication control unit 20 and transfers the received image data of the document to the selected remote FAX 9, and it requests this remote FAX 9 to transmit the image data to the destination FAX 6. Besides, the record control unit 24 of the pictorial image I/O device 62 operates to print document data on recording paper by means of the printer 91 in compliance with the request of the FAX server 1 for printing.

Herein, such a pictorial image I/O device 62 can be constructed using the conventional stand-alone FAX. Accordingly, the stand-alone FAXes which exist at the introduction of the facsimile server system of this embodiment can be effectively utilized as the pictorial image I/O equipment.

Figure 17:
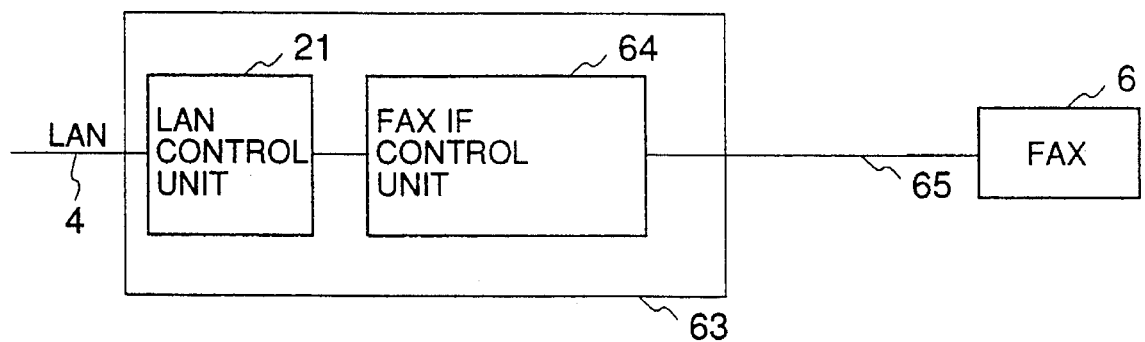
FIG. 17 is a block diagram showing the constituent layout of a terminal control device in an embodiment of the present invention.

FIG. 17 illustrates the construction of the pictorial image I/O device which is constituted by the stand-alone FAX.

This pictorial image I/O device includes the existing FAX 6, and a terminal control device 63 for connecting the existing FAX 6 to the LAN 4. The FAX 6 is of an ordinary type which has the facility of transmitting a document read by a scanner, through a public switched network, and the facility of printing a received document by a printer. It is directly coupled to the terminal control device 63 by a network interface 65. On the other hand, the terminal control device 63 is configured of a FAX IF (interface) control unit 64 which communicates document data with the FAX 6 through the network interface 65, and the LAN control unit 21 which exchanges data through the LAN 4. Besides the facility of FAX communications, the FAX IF control unit 64 has a facility as a pseudo switching system which sends a ringing tone upon detecting the off-hook state of the existing FAX 6 and which connects the network interface 65 upon detecting dial information such as a DTMF (Dual-Tone MultiFrequency) signal sent by the FAX 6.

When the user has set a transmission original on the FAX 6 and has entered a destination telephone No. through the operation panel of this FAX 6, the FAX IF control unit 64 of the terminal control device 63 sends the telephonic ringing tone or the like to the FAX 6 by its facility as the pseudo switching system. The FAX 6 having detected the ringing tone of the switching system delivers the destination telephone No. entered by the user, to the network interface 65 as the dial information. Then, the FAX IF control unit 64 of the terminal control device 63 detects the dial information sent by the FAX 6 and connects the network interface 65. Subsequently, the FAX IF control unit 64 executes the FAX protocol between it and the FAX 6, and it accepts the image data of the document read and delivered to the network interface 65 by the FAX 6 and transfers them to the FAX server 1 sequentially. After having accepted all the image data from the FAX 6, the FAX IF control unit 64 disconnects the network interface 65, and it sends the detected dial information to the FAX server 1 and reserves the FAX transmission. The FAX server 1 having accepted the reservation selects the remote FAX 9 including the FAX communication control unit 20, transfers the document data received from the terminal control device 63 and requests this remote FAX 9 to transmit the data to the FAX 6, in accordance with the transmission request process shown in FIG. 10.

To the contrary, the terminal control device 63 operates in compliance with the request made by the FAX server 1, as follows: It calls the FAX 6, and connects the network interface 65. Subsequently, it codes the data transferred from the FAX server 1, in conformity with the FAX transmission system, and it executes the FAX protocol between it and the FAX 6. Further, it sends the coded data to the FAX 6 and causes this FAX 6 to print the sent data.

Incidentally, the terminal control device 63 may be implemented in the form of a box or an adaptor in which the LAN control unit 21 and the FAX IF control unit 64 are housed in a frame. Alternatively, it may be implemented in such a way that an extended board having a FAX interface facility is mounted on the PC or WS of the client connected to the LAN 4.

As thus far explained, according to this embodiment, the handwritten document can be transmitted as the FAX transmission from any of the remote FAX 9, the pictorial image I/O device 62, and the FAX 6 connected to the terminal control device 63. In introducing the facsimile server system of this embodiment, the user may determine the number of remote FAXes 9 which are to be connected to the public switched network 5, and the number of pictorial image I/O devices 62 or terminal control devices 63 which are to be installed, depending upon the quantity of FAX communications estimated to be performed, the area of the office, the number of persons expected to utilize the system, and so forth. In general, the pictorial image I/O device 62 is inexpensive compared with the remote FAX 9 having the FAX communication facility. Besides, the existing FAX 6 can be effectively utilized as the pictorial image I/O equipment by adopting the terminal control device 63. Further, when the terminal control device 63 is constructed using an information processor such as a PC or WS, it is also applicable to other business uses.

By the way, in the above embodiment, each of the FAX server 1, remote FAX 9, pictorial image I/O device 62 and terminal control device 63 has been explained as transferring the image data of the document in the LAN 4. It is also allowed, however, to incorporate means for coding/decoding the image data in accordance with any of standardized transmission coding methods for FAXes, such as MH (Modified Huffman), MR (Modified READ) and MMR (Modified MR) coding methods, whereby the image data are compressed and then transferred in the LAN 4. Thus, a time period for transferring the document data can be shortened, and the traffic of the LAN 4 can be reduced. In this case, when the coding method adopted for the remote FAX 9 is employed, the coding/decoding processing for the FAX communication is dispensed with in the remote FAX 9. On the other hand, when the coding method adopted for the FAX 6 is employed, the terminal connection device 63 need not be furnished with the coding/decoding facility.

The FAX server 1 includes the storage areas of the document file 15, font memory 17, parameter file 19, etc. within its own equipment, and stores the various sorts of information items therein. It is also allowed, however, to store these information items in the file server 2 and to accept them into the FAX server 1 and then use them as required.

The remote FAX 9 may well be endowed with a stand-alone mode so as to function as the conventional stand-alone FAX when this mode is designated.

In the foregoing embodiments, each of the remote FAXes 9 has been explained as including the pictorial image file 25 which can store the data of at least one document therein. That is, after the remote FAX 9 has accumulated all the data of one document received from the FAX server 1, in the image file 25, it connects the network 5 thereto and transmits the accumulated document data to the opposite FAX 6. Besides, in the case where the remote FAX 9 has received the document data from the opposite FAX 6 through the network 5, it accumulates all the received document data in the image file 25 and thereafter transfers the accumulated document data to the FAX server 1.

The pictorial image file 25 of the remote FAX 9, however, may well be constructed of only a communication buffer for FAX communications which is cyclically operated and used. More specifically, according to the transmission control procedure of the LAN and the protocol of the FAXes, each equipment has the data of one document transmitted thereto in divided units called "frames". Therefore, when requested to transmit the document data by the FAX server 1, the remote FAX 9 may call the opposite FAX 6 through the network 5, and while accumulating the document data frames received from the FAX server 1, in the communication buffer, it may convert the data frames into the data of the FAX data format and then sequentially transmit the resulting data to the opposite FAX 6 in parallel with the accumulating operation. On the other hand, when called through the network 5 by the opposite FAX 6, the remote FAX 9 may accumulate the received document data frames in the communication buffer and sequentially transfer the data of the FAX data format to the FAX server 1 in parallel with the accumulating operation. In this manner, the remote FAX 9 executes the document data transfer processing with the FAX server 1 and the FAX communication processing with the opposite FAX 6 in parallel fashion, whereby the storage capacity of the image file 25 can be reduced, and an inexpensive equipment can be realized.

As explained above, according to the embodiments, the FAX communication processing which needs to be real-time processing has its load distributed to the remote FAXes 9. Thus, the information processor such as PC or WS to operate as the FAX server 1 is permitted to be utilized for the runs of the business application programs etc. which the user uses. Moreover, since the remote FAX 9 can be utilized similarly to the scanner (7 in FIG. 2) and the printer (8) in the prior art, the system cost and installation space of the whole system can be reduced.

As described above, the present invention can provide a facsimile server system in which an information processor such as PC (personal computer) or WS (work station) to operate as a FAX server can be utilized also for the runs of business application programs etc. that a user uses. Besides, it can provide a facsimile server system whose system cost and installation space can be reduced.

What is claimed is:

1. A facsimile server system which offers a facility of facsimile communication proceeding through a communication network, to at least one client connected to facsimile server system via a LAN (local area network), comprising:

a FAX (facsimile) server connected to said LAN, and at least one remote FAX connected to said LAN and said communication network;

said FAX server including LAN control means for controlling a communication which proceeds through said LAN, document data storage means for storing therein at least one document data transferred from the client and requested to be transmitted via said communication network by said client, a transmission document table for registering therein that destination of the document data stored in said document data storage means which has been designated by said client, data conversion means for expanding said document data stored in said document data storage means, into image data on condition that said document data is not image data, and communication management means for transferring said image data which correspond to said document data requested to be transmitted, to the appropriate remote FAX, and for giving said appropriate remote FAX a command for performing the facsimile transmission to said destination which is registered in said transmission document table in correspondence with the transferred image data;

said remote FAX including a LAN control unit for controlling a communication which proceeds through said LAN, a scanner for reading a pictorial image and then generating image data, a printer for printing a pictorial image expressed by image data, and FAX communication control means for performing the commanded facsimile transmission of the image data transferred from said FAX server, to the destination through said communication network.

2. A facsimile server system as defined in claim 1, wherein:

the plurality of remote FAXes (facsimiles) are provided;

the FAX communication control means of each of said remote FAXes notifies said FAX server of an operating level corresponding to a current status of the corresponding remote FAX among at least three operating levels which become lower in the order of a level corresponding to on communication status, a level corresponding to scheduled for transmission status and a level corresponding to unscheduled for transmission status, when the operating level corresponding to the status of said corresponding remote FAX has changed;

said FAX server further includes a status table for storing the received operating levels of the respective remote FAXes therein; and said communication management means of said FAX server refers to said status table to find the remote FAX of the lowest operating level, transfers said image data to the found remote FAX and commands said found remote FAX to perform the FAX transmission of the transferred image data.

3. A facsimile server system as defined in claim 1, wherein:

the plurality of remote FAXes (facsimiles) are provided;

said transmission document table is capable of registering therein a plurality of destinations for one of the document data; and on condition that the plurality of destinations are registered in said transmission document table in correspondence with document data requested to be transmitted, said communication management means selects the plurality of remote FAXes, it transfers the image data corresponding to said document data requested to be transmitted to the respective selected remote FAXes, and it commands each of said selected remote FAXes to perform the FAX transmission of the transferred image data to that one of said plurality of registered destinations which has been exclusively selected.

4. A facsimile server system as defined in claim 1, wherein:

said FAX server includes timer means for timekeeping;

said transmission document table registers therein transmission time and date of said document data stored in said document data storage means as designated by said client;

in a case where said communication management means has accepted an instruction for stopping an activity of said FAX server and a designation of a next time for starting the activity, it refers to said timer means to find the document data whose transmission time registered in said transmission document table falls within a time period from a current time to the next activity start time, it expands the found document data into the image data by said data conversion means if they are not said image data, it transfers the image data corresponding to the document data found to fall within said time period, to the appropriate remote FAX, and it commands said appropriate remote FAX to perform the FAX transmission of the transferred image data to said destination and at said transmission time which are registered in said transmission document table in correspondence with said transferred image data;

said remote FAX includes timer means for timekeeping; and said FAX communication control means performs said FAX transmission of said image data received from said FAX server, to the commanded destination and at the commanded transmission time.

5. A facsimile server system as defined in claim 1, wherein:

said remote FAX further includes operation control means for accepting an operation of a user;

in a case where said operation control means has accepted a designation of the destination and an instruction for the transmission, said scanner reads the pictorial image and generates the image data; and in the case where said operation control means has accepted the designation of said destination and the instruction for said transmission, said FAX communication control means operates as a client which transfers said image data generated by said scanner, to said FAX server as the document data, and which requests said FAX server to transmit the transferred image data to the designated destination.

6. A facsimile server system as defined in claim 5, wherein:

in a case where said operation control means has accepted the designation of said destination and where it has accepted either of intentional or unintentional designations of an immediate transmission, said FAX communication control means performs the facsimile transmission of said image data generated by said scanner, to said designated destination via said communication network, instead of transferring the generated image data to said FAX server and requesting said FAX server to transmit said transferred image data to said designated destination.

7. A facsimile server system as defined in claim 6, wherein:

in the case where said operation control means has accepted said designation of said destination and said instruction for said transmission and where it has accepted either of the intentional or unintentional designations of the immediate transmission, said FAX communication control means of said remote FAX notifies said FAX server of said designated destination and requests said FAX server to transfer the image data which are to be transmitted to the same destination as the notified destination;

in a case where said FAX server has been notified of said destination and requested to transfer said image data which are to be transmitted to said same destination, by said remote FAX, said communication management means of said FAX server expands the document data whose destination registered in said transmission document table is the same as said notified destination, into the image data by said data conversion means if they are not said image data, and it transfers the image data corresponding to the document data whose destination registered in said transmission document table is the same as said notified destination, to said remote FAX which has made the request for the transfer; and in a case where said remote FAX receives the image data transferred from said FAX server in response to said request to transfer the image data, said FAX communication control means of said remote FAX joins said image data transferred from said FAX server, to said image data generated by said scanner, and performs the facsimile transmission of the conjoined image data to said designated destination.

8. A facsimile server system as defined in claim 1, wherein:

the plurality of remote FAXes (facsimiles) are provided;

each of said FAX communication control means of said remote FAXes receives the facsimile transmission which proceeds through said communication network, and transfers received image data to said FAX server as received document data; and said communication management means of said FAX server stores the received document data transferred from the remote FAXes, in said document data storage means in correspondence with the respective remote FAXes.

9. A facsimile server system as defined in claim 8, wherein:

each of said remote FAXes further includes operation control means for accepting an operation of a user;

in a case where said operation control means has accepted an instruction for reading the pictorial image, said scanner reads said pictorial image and generates the image data, and said FAX communication control means transfers the generated image data to said FAX server as read document data; and said communication management means of said FAX server stores the read document data transferred from the remote FAXes, in said document data storage means in correspondence with the respective remote FAXes.

10. A facsimile server system as defined in claim 8, wherein:

said remote FAX further includes a pictorial image file for storing therein said image data received by said FAX communication control means;

said FAX communication control means of said remote FAX accumulates the received image data in said pictorial image file and manages a remaining capacity of said pictorial image file while an activity of said FAX server is stopped, and it notifies said FAX server of the remaining capacity of said pictorial image file in compliance with a command given by said FAX server;

said communication management means of said FAX server commands the respective remote FAXes, upon start of the activity of said FAX server, to notify the remaining capacities of the corresponding pictorial image files and receives the notifications of said remaining capacities from said respective remote FAXes, commands said remote FAXes to transfer the reception document data successively from the remote FAX whose pictorial image file has the smallest remaining capacity, and stores the transferred reception document data in said document data storage means in correspondence with said respective remote FAXes; and said FAX communication control means of each of said remote FAXes reads out said image data stored in said pictorial image file and transfers them to said FAX server as the reception document data when commanded to transfer the received document by said FAX server.

11. A facsimile server system as defined in claim 1, wherein:

said document data storage means of said FAX server stores therein at least one print document data which said client has requested said FAX server to print, said data conversion means expands the print document data stored in said document data storage means, into the image data on condition that said document data is not image data, and said communication management means transfers the image data corresponding to the document data requested to be printed, to the appropriate remote FAX and then commands said appropriate remote FAX to print said image data transferred from said FAX server; and said printer of said remote FAX prints the pictorial image expressed by said image data transferred from said FAX server when commanded to print said image data by said FAX server.

12. A facsimile server system as defined in claim 1, wherein said remote Fax further includes operation control means for accepting an operation of a user:

said operation control means includes a plurality of input keys;

said remote FAX further includes a parameter table for storing therein corresponding relations between destination telephone Nos. and either abbreviation Nos. or predetermined one of said input keys of said operation control means;

said operation control means accepts designations of said telephone Nos. of the corresponding destinations through either of said abbreviation Nos. or the predetermined input keys, it sets the contents of said parameter table in accordance with a command transferred from said FAX server for setting the parameter table contents, and it transfers said parameter table contents to said FAX server when commanded to transfer them by said FAX server; and said FAX server further includes a parameter file for storing therein the contents of the parameter tables of the respective remote FAXes, and parameter management means for periodically commanding said respective remote FAXes to transfer said contents of said parameter tables and then storing the transferred contents of said parameter tables in said parameter file, and for altering said contents of said parameter tables in compliance with an instruction sent from said client and then commanding said respective remote FAXes to set said contents of said parameter tables so as to be adapted for the altered contents of said parameter tables.

13. A facsimile server system as defined in claim 1, wherein:

said FAX communication control means of said remote FAX stores therein a history of the FAX communications having been performed, and transfers the communication history when commanded to transfer said communication history by said FAX server; and said FAX server further includes parameter management means for periodically commanding the respective remote FAXes to transfer the communication histories, and for editing the transferred communication histories and creating a report for communication management in compliance with a command given by said client.

14. A facsimile server system as defined in claim 8, wherein:

said FAX communication control means of said remote FAX stores therein a history of the FAX communications having been performed, and transfers the communication history when commanded to transfer said communication history by said FAX server; and said FAX server further includes parameter management means for periodically commanding the respective remote FAXes to transfer the communication histories, and for editing the transferred communication histories and creating a report for communication management in compliance with a command given by said client.

15. A client/server system comprising;

a) a facsimile server system which offers a facility of facsimile communication proceeding through a communication network, to at least one client connected to said facsimile server system via a LAN (local area network); and b) a database connected to said LAN; wherein said facsimile server system includes;

a FAX (facsimile) server connected to said LAN, and at least one remote FAX connected to said LAN and said communication network;

said FAX server including LAN control means for controlling a communication which proceeds through said LAN, document data storage means for storing therein at least one document data which have been transferred from the client and requested to be transmitted via said communication network by said client, a transmission document table for registering therein that destination of the document data stored in said document data storage means which has been designated by said client, data conversion means for expanding said document data stored in said document data storage means, into image data on condition that said document data is not image data, and communication management means for transferring said image data which correspond to said document data requested to be transmitted, to the appropriate remote FAX, and for giving said appropriate remote FAX a command for performing the facsimile transmission to said destination which is registered in said transmission document table in correspondence with the transferred image data;

said remote FAX including a LAN control unit for controlling a communication which proceeds through said LAN, a scanner for reading a pictorial image and then generating image data, a printer for printing a pictorial image expressed by image data, and FAX communication control means for performing the commanded facsimile transmission of the image data transferred from said FAX server, to the destination through said communication network; and said database server includes means for transferring document data generated in accordance with a predetermined procedure, to said FAX server, and requesting said FAX server to perform the facsimile transmission to a predetermined destination, when a predetermined event has occurred.

16. A facsimile server system which offers a facility of facsimile communication proceeding through a communication network, to at least one client connected to facsimile server system via a LAN (local area network), comprising:

a FAX (facsimile) server connected to said LAN, and at least one remote FAX connected to said LAN and said communication network;

said FAX server including LAN control means for controlling a communication which proceeds through said LAN, document data storage means for storing therein at least one document data transferred from said client and requested to be transmitted via said communication network by said client, a transmission document table for registering therein that destination of the document data stored in said document data storage means which has been designated by said client, data conversion means for expanding said document data stored in said document data storage means, into image data on condition that said document data is not image data, and communication management means for transferring said image data which correspond to said document data requested to be transmitted, to the appropriate remote FAX, and for giving said appropriate remote FAX a command for performing the facsimile transmission to said destination which is registered in said transmission document table in correspondence with the transferred image data;

said remote FAX including LAN control unit for controlling a communication which proceeds through said LAN and FAX communication control means for performing the commanded facsimile transmission of the image data transferred from said FAX server, to the destination through said communication network.

17. A facsimile server system as defined in claim 16, wherein:

the plurality of remote FAXes (facsimiles) are provided;

the FAX communication control means of each of said remote FAXes notifies said FAX server of an operating level corresponding to a current status of the corresponding remote FAX among at least three operating levels which become lower in the order of a level corresponding to on communication status, a level corresponding to scheduled for transmission status and a level corresponding to unscheduled for transmission status, when the operating level corresponding to the status of said corresponding remote FAX has changed;

said FAX server further includes a status table for storing the received operating levels of the respective remote FAXes therein; and said communication management means of said FAX server refers to said status table to find the remote FAX of the lowest operating level, transfers said image data to the found remote FAX and commands said found remote FAX to perform the FAX transmission of the transferred image data.

18. A facsimile server system as defined in claim 16, wherein:

the plurality of remote FAXes (facsimiles) are provided;

said transmission document table is capable of registering therein a plurality of destinations for one of the document data; and on condition that the plurality of destinations are registered in said transmission document table in correspondence with document data requested to be transmitted, said communication management means selects the plurality of remote FAXes, it transfers the image data corresponding to said document data requested to be transmitted to the respective selected remote FAXes, and it commands each of said selected remote FAXes to perform the FAX transmission of the transferred image data to that one of said plurality of registered destinations which has been exclusively selected.

19. A facsimile server system as defined in claim 16, wherein:

said FAX server includes timer means for timekeeping;

said transmission document table registers therein transmission time and data of said document data stored in said document data storage means as designated by said client;

in a case where said communication management means has accepted an instruction for stopping an activity of said FAX server and a designation of a next time for starting the activity, it refers to said timer means to find the document data whose transmission time registered in said transmission document table falls within a time period from a current time to the next activity start time, it expands the found document data into the image data by said data conversion means if they are not said image data, it transfers the image data corresponding to the document data found to fall within said time period, to the appropriate remote FAX, and it commands said appropriate remote FAX to perform the FAX transmission of the transferred image data to said destination and at said transmission time which are registered in said transmission document table in correspondence with said transferred image data;

said remote FAX includes timer means for timekeeping; and said FAX communication control means performs said FAX transmission of said image data received from said FAX server, to the commanded destination and at the commanded transmission time.

20. A facsimile server system as defined in claim 16, wherein:

said remote FAX further includes a scanner for reading a pictorial image and then generating image data and operation control means for accepting an operation of a user;

in a case where said operation control means has accepted a designation and an instruction for the transmission, said scanner reads the pictorial image and generates the image data; and in the case where said operation control means has accepted the designation of said destination and the instruction for said transmission, said FAX communication control means operates as a client which transfers said image data generated by said scanner, to said FAX server as the document data, and which requests said FAX server to transmit the transferred image data to the designated destination.

21. A facsimile server system as defined in claim 20, wherein:

in a case where said operation control means has accepted the designation of said destination and where it has accepted either of intentional or unintentional designations of an immediate transmission, said FAX communication control means performs the facsimile transmission of said image data generated by said scanner, to said designated destination via said communication network, instead of transferring the generated image data to said FAX server and requesting said FAX server to transmit said transferred image data to said designated destination.

22. A facsimile server system as defined in claim 21, wherein:

in the case where said operation control means has accepted said designation of said destination and said instruction for said transmission and where it has accepted either of the intentional or unintentional designations of the immediate transmission, said FAX communication control means of said remote FAX notifies said FAX server of said designated destination and requests said FAX server to transfer the image data which are to be transmitted to the same destination as the notified destination;

in a case where said FAX server has been notified of said destination and requested to transfer said image data which are to be transmitted to said same destination, by said remote FAX, said communication management means of said FAX server expands the document data whose destination registered in said transmission document table is the same as said notified destination, into the image data by said data conversion means if they are not said image data, and it transfers the image data corresponding to the document data whose destination registered in said transmission document table is the same as said notified destination, to said remote FAX which has made the request for the transfer; and in a case where said remote FAX receives the image data transferred from said FAX server in response to said request to transfer the image data, said FAX communication control means of said remote FAX joins said image data transferred from said FAX server, to said image data generated by said scanner, and performs the facsimile transmission of the conjoined image data to said designated destination.

23. A facsimile server system as defined in claim 16, wherein said remote FAX further includes operation control means for accepting an operation of a user:

said operation control means includes a plurality of input keys;

said remote FAX further includes a parameter table for storing therein corresponding relations between destination telephone numbers and either abbreviation numbers or predetermined one of said input keys of said operation control means;

said operation control means accepts designations of said telephone numbers of the corresponding destinations through either of said abbreviation numbers or the predetermined input keys, it sets the contents of said parameter table in accordance with a command transferred from said FAX server for setting the parameter table contents to said FAX server when commanded to transfer them by said FAX server; and said Fax server further includes a parameter file for storing therein the contents of the parameter tables of the respective remote FAXes, and parameter management means for periodically commanding said respective remote FAXes to transfer said contents of said parameter tables and then storing the transferred contents of said parameter tables in said parameter file, and for altering said contents of said parameter tables in compliance with an instruction sent from said client and then commanding said respective remote FAXes to set said contents of said parameter tables so as to be adapted for the altered contents of said parameter tables.

24. A facsimile server system as defined in claim 16, wherein:

said FAX communication control means of said remote FAX stores therein a history of the FAX communications having been performed, and transfers the communication history when commanded to transfer said communication history by said FAX server; and said FAX server further includes parameter management means for periodically commanding the respective remote FAXes to transfer the communication histories, and for editing the transferred communication histories and creating a report for communication management in compliance with a command given by said client.

25. A facsimile server system which offers a facility of facsimile communication proceeding through a communication network, to at least one client connected to facsimile server system via a LAN (local area network), comprising:

a FAX (facsimile) server connected to said LAN, and plurality of remote FAXes connected to said LAN and said communication network;

each of said remote FAXes including a LAN control unit for controlling a communication which proceeds through said LAN, and FAX communication control means for receiving the facsimile transmission which proceeds through said communication network and for transferring received image data to said FAX server; and said FAX server including LAN control means for controlling a communication which proceeds through said LAN, document storage means for storing image data, and communication management means for storing the received image data transferred from the remote FAXes, in said document data storage means in correspondence with the respective remote FAXes.

26. A facsimile server system as defined in claim 25, wherein:

said remote FAX further includes a pictorial image file for storing therein said image date received by said FAX communication control means;

said FAX communication control means of said remote FAX accumulates the received image data in said pictorial image file and manages a remaining capacity of said pictorial image file while an activity of said FAX server is stopped, and it notifies said FAX server of the remaining capacity of said pictorial image file in compliance with a command given by said FAX server;

said communication management means of said FAX server commands the respective remote FAXes, upon start of the activity of said FAX server, to notify the remaining capacities of the corresponding pictorial image files and receives the notifications of said remaining capacities from said respective remote FAXes, commands said remote FAXes to transfer the received image data successively from the remote FAX whose pictorial image file has the smallest remaining capacity, and stores the transferred received image data in said document data storage means in correspondence with said respective remote FAXes; and said FAX communication control means of each of said remote FAXes reads out said image data stored in said pictorial image file and transfers them to said FAX server as the received image data when commanded to transfer the received image data by said FAX server.

27. A facsimile server system as defined in claim 25, wherein:

said FAX communication control means of said remote FAX stores therein a history of the FAX communications having been performed, and transfers the communication history when commanded to transfer said communication history by said FAX server; and said FAX server further includes parameter management means for periodically commanding the respective remote FAXes to transfer the communication histories, and for editing the transferred communication histories and creating a report for communication management in compliance with a command given by said client.

28. A facsimile server system which offers a facility of facsimile communication proceeding through a communication network, to at least one client connected to facsimile server system via a LAN (local area network), comprising:

a FAX (facsimile) server connected to said LAN, and plurality of remote FAXes connected to said LAN and said communication network;

each of said remote FAXes including a LAN control unit for controlling a communication which proceeds through said LAN, operation control means for accepting an operation of a user, and a scanner for reading pictorial image data, for generating image data and for transferring generated image data to said FAX server, when said operation control means accepts a predetermined operation of the user; and said FAX server including LAN control means for controlling a communication which proceeds through said LAN, document data storage means for storing image data, and communication management means for storing the generated image data transferred from the remote FAXes, in said document data storage means in correspondence with the respective remote FAXes.

29. A facsimile server system which offers a facility of facsimile communication proceeding through a communication network, to at least one client connected to facsimile server system via a LAN (local area network), comprising:

a FAX (facsimile) server connected to said LAN, and at least one of remote FAXes connected to said LAN and said communication network;

said FAX server including LAN control means for controlling a communication which proceeds through said LAN, document data storage means for storing therein at least one document data transferred from the client and requested to be printed by the client, data conversion means for expanding said document data stored in said document storage means, into image data on condition that said document data is not image data, and communication management means for transferring said image data which correspond to said document data requested to be printed, to the appropriate remote FAX, and for giving said appropriate remote FAX a command for performing the printing; and said remote FAX including a LAN control unit for controlling a communication which proceeds through said LAN, and printer for printing the image data transferred from said FAX server.

30. A facsimile server system which offers a facility of facsimile communication proceeding through a communication network, to at least one client connected to facsimile server system via a LAN (local area network), comprising:

a FAX (facsimile) server connected to said LAN, and at least one remote FAX connected to said LAN and said communication network;

said FAX server including LAIN control means for controlling a communication which proceeds through said LAN, data storage means for storing therein at least one data transferred from the client and requested to be transmitted via said communication network by said client, a transmission table for registering therein that destination of the data stored in said data storage means which has been designated by said client, and communication management means for transferring said data requested to be transmitted, to the appropriate remote FAX, and for giving said appropriate remote FAX a command for performing the facsimile transmission to said destination which is registered in said transmission table in correspondence with the transferred data;

said remote FAX including a LAN control unit for controlling a communication which proceeds through said LAN, a scanner for reading a pictorial image and then generating data, a printer for printing a pictorial image expressed by data, and FAX communication control means for performing the commanded facsimile transmission of the data transferred from said FAX server, to the destination through said communication network.

* * * * *

UNITED STATES PATENT AND TRADEMARK OFFICE
CERTIFICATE OF CORRECTION

PATENT NO. : 5,552,901
DATED : September 3, 1996
INVENTOR(S) : Satoshi Kikuchi, Hiromichi Itoh, Hiroshi Kawamura It is certified that error appears in the above-indentified patent and that said Letters Patent is hereby corrected as shown below: On the title page, item [73]:

Please add "Hitachi, Ltd., Japan" as Assignee;

Col. 33: In claim 26, line 4, change "date" to read —data—; and

Col. 34: In claim 30, line 8, change "LAIN" to read —LAN—.

Signed and Sealed this

Twenty-eighth Day of January, 1997

Attest:

BRUCE LEHMAN

Attesting Officer   Commissioner of Patents and Trademarks